United States Patent
Hu et al.

(10) Patent No.: US 12,384,033 B1
(45) Date of Patent: Aug. 12, 2025

(54) PATH TRACKING METHOD AND DEVICE FOR IN-OIL INSPECTION ROBOT FOR STORAGE TANK BOTTOM PLATE IN INVISIBLE ENVIRONMENT

(71) Applicant: China Special Equipment Inspection & Research Institute, Beijing (CN)

(72) Inventors: Bin Hu, Beijing (CN); Xiyue Zou, Beijing (CN); Yan Zhang, Beijing (CN); Zhiquan Wang, Beijing (CN); Ting Wang, Beijing (CN)

(73) Assignee: China Special Equipment Inspection & Research Institute, Beijing (CN)

( * ) Notice: Subject to any disclaimer, the term of this patent is extended or adjusted under 35 U.S.C. 154(b) by 0 days.

(21) Appl. No.: 19/192,418

(22) Filed: Apr. 29, 2025

(30) Foreign Application Priority Data

May 10, 2024 (CN) .......................... 202410571367.2

(51) Int. Cl.
| | |
|---|---|
| *B25J 9/16* | (2006.01) |
| *B25J 11/00* | (2006.01) |
| *B25J 13/08* | (2006.01) |
| *G05D 1/246* | (2024.01) |

(52) U.S. Cl.
CPC ........... *B25J 9/1664* (2013.01); *B25J 11/008* (2013.01); *B25J 13/08* (2013.01); *B25J 13/089* (2013.01); *G05D 1/246* (2024.01)

(58) Field of Classification Search
CPC ...... B25J 9/1664; B25J 9/1666; B25J 9/1669; B25J 9/1674; B25J 9/1676; B25J 9/1679; B25J 9/1694; B25J 11/008; B25J 13/08; B25J 13/087; B25J 13/088; B25J 13/089; G05D 1/0255; G05D 1/0273; G05D 1/12; G05D 1/2295; G05D 1/24; G05D 1/242; G05D 1/246–2469; G05D 1/622; G05D 1/648; G05D 1/6484
See application file for complete search history.

(56) References Cited

U.S. PATENT DOCUMENTS

| | | | |
|---|---|---|---|
| 2023/0393101 A1* | 12/2023 | Briggs, IV | ........... G01N 29/225 |
| 2024/0111306 A1* | 4/2024 | Oshiro | ................ G05D 1/6445 |

* cited by examiner

*Primary Examiner* — Spencer D Patton
(74) *Attorney, Agent, or Firm* — Bayramoglu Law Offices LLC

(57) ABSTRACT

A path tracking method and device for an in-oil inspection robot for a storage tank bottom plate in an invisible environment are provided. The method includes: determining a current position of a robot in a rasterized storage tank bottom plate drawing; when the current position is located in an inspected area, searching a cell of an uninspected area closest to the current position as a target point, and planning a moving path to the target point and a scanning path for inspecting the uninspected area where the target point is located; controlling the robot to move to the target point using a path tracking algorithm; and completing inspection of the uninspected area where the target point is located with the target point as a starting point. According to the method, a path of the robot can be planned and tracked automatically, improving inspection efficiency.

14 Claims, 13 Drawing Sheets

|     | 4h      | 3g/3h | 4g    |     |
|-----|---------|-------|-------|-----|
| 4d  | 2d/2h   | 1g/1h | 2b/2g | 4b  |
| 3c/3d | 1c/1d | 0     | 1a/1b | 3a/3b |
| 4c  | 2c/2f   | 1e/1f | 2a/2e | 4a  |
|     | 4f      | 3e/3f | 4e    |     |

FIG. 4A

| 9 | 8 | 7 | 6 | 7 | 8 | 9 |
|---|---|---|---|---|---|---|
| 8 | 5 | 4 | 3 | 4 | 5 | 8 |
| 7 | 4 | 2 | 1 | 2 | 4 | 7 |
| 6 | 3 | 1 | 0 | 1 | 3 | 6 |
| 7 | 4 | 2 | 1 | 2 | 4 | 7 |
| 8 | 5 | 4 | 3 | 4 | 5 | 8 |
| 9 | 8 | 7 | 6 | 7 | 8 | 9 |

FIG. 4B

PATH TRACKING METHOD AND DEVICE FOR IN-OIL INSPECTION ROBOT FOR STORAGE TANK BOTTOM PLATE IN INVISIBLE ENVIRONMENT

CROSS REFERENCE TO RELATED APPLICATIONS

This application is based upon and claims priority to Chinese Patent Application No. 202410571367.2 filed on May 10, 2024, the entire contents of which are incorporated herein by reference.

TECHNICAL FIELD

The present disclosure relates to the technical field of automatic control, in particular to a path tracking method and device for an in-oil inspection robot for a storage tank bottom plate in an invisible environment.

BACKGROUND

In the field of petrochemical industry, the large vertical storage tank is a metal storage tank for storing crude oil and refined oil, which has a diameter generally ranging from a dozen meters to tens of meters. These storage media are generally flammable, explosive and corrosive, which brings great challenges to inspection and maintenance of storage tanks. As the most seriously corroded area in the storage tank, the storage tank bottom plate is particularly important in terms of inspection. The existing inspection methods usually require periodic storage tank cleaning followed by manual bottom plate inspection. However, problems such as medium transfer and sediment cleaning on the tank bottom plate have brought challenges to the inspection of the storage tank. With the development of technology, the robot inspection technology is constantly being applied to the inspection of the storage tank bottom plate. In addition to the robot for detecting the storage tank bottom plate after the tank is opened, an in-oil inspection robot for the storage tank has also become a research hotspot. The in-oil inspection robot for the storage tank is a robot which is hoisted into the storage tank medium through a manhole at the top of the storage tank to inspect the defects of the bottom plate. The core difficulty is to realize path planning and tracking of the robot in the invisible environment.

SUMMARY

The present disclosure aims to provide a path tracking method and device for an in-oil inspection robot for a storage tank bottom plate in an invisible environment, which can realize the automatic path planning and tracking of the in-oil inspection robot for the storage tank, thereby greatly improving inspection efficiency.

In order to achieve the above purpose, the present disclosure provides the following scheme.

The present disclosure relates to a path tracking method for an in-oil inspection robot for a storage tank bottom plate in an invisible environment. The method includes the following steps.

A current position of a robot in a rasterized storage tank bottom plate drawing is determined according to an ultrasonic positioning signal of the robot. The rasterized storage tank bottom plate drawing is marked with an impassable area, an inspected area and an uninspected area.

When the current position is located in the detected area, a cell of the uninspected area closest to the current position is searched as a target point based on the rasterized storage tank bottom plate drawing.

A moving path to the target point and a scanning path for inspecting the uninspected area where the target point is located are planned using the rasterized storage tank bottom plate drawing.

The robot is controlled to move to the target point using a path tracking algorithm according to the moving path.

The inspection of the uninspected area where the target point is located with the target point as a starting point is completed according to the scanning path, and the rasterized storage tank bottom plate drawing is updated.

In one embodiment, a method for searching the cell of the uninspected area closest to the current position based on the rasterized storage tank bottom plate drawing is a diffusion method.

In one embodiment, planning the moving path to the target point using the rasterized storage tank bottom plate drawing specifically includes the following steps.

It is assumed that a value of m is 1.

The current position is setting as an $m^{th}$ starting point.

The included angles between a direction of the $m^{th}$ starting point and the target point and all movable directions are determined, and a movable direction with the minimum included angle is determined as a target moving direction. The movable directions are directions of eight directions of 0°, 45°, 90°, 135°, 180°, 225°, 270° and 315°, in which a next cell to the $m^{th}$ starting point does not belong to the impassable area.

It is determined whether there are impassable areas in n cells with the $m^{th}$ starting point as the starting point in the target moving direction, where n is the predetermined number of cells for a single planning.

When there is no impassable area, a sub-path formed by moving the n cells in the target moving direction with the $m^{th}$ starting point as the starting point, is added to the moving path, and an $n^{th}$ cell in the target moving direction with the $m^{th}$ starting point as the starting point is set as an $(m+1)^{th}$ starting point.

When there is an impassable area, a sub-path formed by moving n' cells in the target moving direction with the $m^{th}$ starting point as the starting point, is added to the moving path, and an $n'^{th}$ cell in the target moving direction with the $m^{th}$ starting point as the starting point is set as the $(m+1)^{th}$ starting point; where n' is the number of cells between a cell of the impassable area closest to the $m^{th}$ starting point in the target moving direction and the $m^{th}$ starting point.

The value of m is increased by 1, and the process returns to the determining included angles between a direction of the $m^{th}$ starting point and the target point and all movable directions, and determining a movable direction with a minimum included angle as a target moving direction, for repeating, until the moving path connecting the current position and the target point is obtained.

In one embodiment, the controlling the robot to move to the target point using a path tracking algorithm according to the moving path specifically includes the following steps.

The current position of the robot in the rasterized storage tank bottom plate drawing is determined according to the ultrasonic positioning signal of the robot.

A deviation angle error is calculated according to the current position and the moving path.

When the deviation angle error is greater than a deviation angle error threshold, the moving direction of the robot is corrected through a spin turn.

When the deviation angle error is not greater than the deviation angle error threshold, the moving direction of the robot is corrected by correcting the deviation while the robot is moving forward.

In one embodiment, the formula of calculating the deviation angle error is:

$$\cos\theta = \frac{u_1 v_1 + u_2 v_2}{\sqrt{u_1^2 + v_1^2}\sqrt{u_2^2 + v_2^2}},$$

where $\theta$ is the deviation angle error, $(u_1, v_1)$ is a vector $P_iA$, $P_i$ is a position of an $i^{th}$ path point, A is the current position, $(u_2, v_2)$ is a vector $P_iP_{i+1}$, and $P_{i+1}$ is a position of an $(i+1)^{th}$ path point, where $P_i$ is located before A, $P_{i+1}$ is located after A, $u_1$ and $v_1$ are an x-axis distance and a y-axis distance between A and $P_i$, respectively, and $u_2$ and $v_2$ are an x-axis distance and a y-axis distance between $P_{i+1}$ and $P_i$, respectively.

In one embodiment, correcting the moving direction of the robot through the spin turn specifically includes the following steps.

The following formula is used to calculate an angle to be rotated:

$\beta_{final}=\alpha+\theta$, where $\beta_{final}$ is the angle to be rotated, $\alpha$ is an included angle between a vector $AP_{i+1}$ and the vector $P_iP_{i+1}$, $\theta$ is the deviation angle error, A is the current position, $P_i$ is a position of an $i^{th}$ path point, and $P_{i+1}$ is a position of an $(i+1)^{th}$ path point, where $P_i$ is located before A, and $P_{i+1}$ is located after A.

It is assumed that a value of k is 1.

A rotation angle 8% of the robot when the robot accelerates from a static state to a constant speed state in a $k^{th}$ rotation process is acquired using an inertial navigation sensor of the robot, where p denotes a $p^{th}$ data point, that is, the data point where the robot is inspected to enter the constant speed state.

In the constant speed state, the rotation angle of the robot is constantly acquired using the inertial navigation sensor of the robot until a formula $$\frac{\omega_s - \omega_{s-1}}{\omega_{s-1}} > K_\beta$$

is satisfied, and then the robot is controlled to stop rotating, where $\omega_s$ is a slope between an $s^{th}$ data point and a $p^{th}$ data point, $\omega_{s-1}$ is a slope between an $(s-1)^{th}$ data point and a $p^{th}$ data point, and $K_\beta$ is an anomaly determination threshold.

The following formula is used to calculate a $k^{th}$ rotation angle:

$\beta_{end}^k=\beta_p^k+(s-p)\omega_p^k\Delta t+\beta_{stop}(\omega_s^k)$, where $\beta_{end}^k$ is the $k^{th}$ rotation angle, $\beta_p^k$ is the rotation angle of the robot when the robot accelerates from the static state to the constant speed state in the $k^{th}$ rotation process, $\beta_{stop}(\omega_s^k)$ is an inertia rotation function of the robot, which is used to calculate a rotation angle of the robot when the robot changes from $\omega_s^k$ to a stopped state, $\omega_p^k$ is the rotation speed of the robot when the robot accelerates from the static state to the constant speed state in the $k^{th}$ rotation process, $\omega_s^k$ is a rotation speed of the robot when the robot enters an abnormal steering stage from the constant speed state in the $k^{th}$ rotation process, and $\Delta t$ is a time interval between two adjacent data points.

The value of k is increased by 1, and the process returns to the step of acquiring a rotation angle $\beta_p^k$ of the robot when the robot accelerates from a static state to a constant speed state in the $k^{th}$ rotation process using an inertial navigation sensor of the robot, for repeating, until the robot rotates to the angle to be rotated.

In one embodiment, the correcting the moving direction of the robot by correcting a deviation while the robot is moving forward specifically includes the following steps.

Rotation speeds of a left motor and a right motor of the robot are controlled so that a power difference between the left motor and the right motor is less than a power unbalanced threshold; the left motor is configured to provide power to a left driving wheel of the robot, and the right motor is configured to provide power to a right driving wheel of the robot.

Alternatively, a Proportional Integral Differential (PID) control algorithm is used to control the rotation speeds of the left motor and the right motor of the robot, so that a path vertical deviation of the robot is less than a vertical deviation threshold.

In one embodiment, the formula of calculating the path vertical deviation is:

$$d = \begin{cases} \dfrac{kx_A - y_A + b}{\sqrt{k^2+1}}, & y_i \neq y_{i+1} \\ x_A - x_i, & y_i = y_{i+1} \end{cases};$$

where d is a path vertical deviation, k is a first-order coefficient, $$k = \frac{y_{i+1} - y_i}{x_{i+1} - x_i}, b$$

is a constant coefficient, $b=y_i-kx_i$, $x_i$ and $y_i$ are an x-axis coordinate and a y-axis coordinate of the $i^{th}$ path point, $x_{i+1}$ and $y_{i+1}$ are an x-axis coordinate and a y-axis coordinate of the $(i+1)^{th}$ path point, and $x_A$ and $y_A$ are an x-axis coordinate and a y-axis coordinate of the current position.

In one embodiment, in the step of "controlling the robot to move to the target point using a path tracking algorithm according to the moving path" and the step of "completing inspection of the uninspected area where the target point is located with the target point as a starting point, according to the scanning path, and updating the rasterized storage tank bottom plate drawing", the following steps are further executed.

A new obstacle in the travelling process of the robot is inspected using six ultrasonic distance sensors provided on the robot. The new obstacle is an obstacle that is not marked on the current rasterized storage tank bottom plate drawing.

When there is a new obstacle, the position where the new obstacle is located is marked as an impassable area on the rasterized storage tank bottom plate drawing, and it is inspected whether an obstacle closed area is formed on the rasterized storage tank bottom plate drawing using a four-way seed filling algorithm.

When an obstacle closed area is formed, the position where the obstacle closed area is located is marked as an impassable area on the rasterized storage tank bottom plate drawing.

Then, the process returns to the step of "determining a current position of a robot in a rasterized storage tank bottom plate drawing according to an ultrasonic positioning signal of the robot".

A path tracking device for an in-oil inspection robot for a storage tank bottom plate in an invisible environment includes a positioning module, an inspection sensor, an obstacle avoidance sensor array and a main control module. The positioning module includes ultrasonic transmitters positioned in the front of the robot and in the rear of the robot. The obstacle avoidance sensor array includes three ultrasonic distance sensors installed in different directions in the front of the robot and three ultrasonic distance sensors installed in different directions in the rear of the robot. The positioning module, the inspection sensor and the obstacle avoidance sensor array are all connected with the main control module, and the main control module is connected with a control terminal of the robot. The main control module is configured to execute the method described above to track a path of the robot.

According to the specific embodiment provided by the present disclosure, the present disclosure discloses the following technical effects.

The embodiment of the present disclosure provides a path tracking method and device for an in-oil inspection robot for a storage tank bottom plate in an invisible environment. The method includes: determining a current position of a robot in a rasterized storage tank bottom plate drawing according to an ultrasonic positioning signal of the robot, the rasterized storage tank bottom plate drawing is marked with an impassable area, a inspected area and an uninspected area; when the current position is located in the inspected area, searching a cell of the uninspected area closest to the current position as a target point based on the rasterized storage tank bottom plate drawing; planning a moving path to the target point and a scanning path for inspecting the uninspected area where the target point is located using the rasterized storage tank bottom plate drawing; controlling the robot to move to the target point using a path tracking algorithm according to the moving path; and completing inspection of the uninspected area where the target point is located with the target point as a starting point, according to the scanning path, and updating the rasterized storage tank bottom plate drawing. According to the method, the path is planned by using a regional traversal algorithm, and the planned path is tracked by using the path tracking algorithm. According to the method, a path of an in-oil inspection robot for a storage tank can be planned and tracked automatically, which greatly improves the inspection efficiency.

BRIEF DESCRIPTION OF THE DRAWINGS

In order to explain the technical scheme in the embodiments of the present disclosure or the prior art more clearly, the drawings needed in the embodiments will be briefly introduced hereinafter. Obviously, the drawings described below are only some embodiments of the present disclosure. Other drawings can be obtained according to these drawings without paying creative labor for those skilled in the art.

FIGS. 4A and 4B are exemplary diagrams of a priority of pathfinding with a diffusion method being used according to an embodiment of the present disclosure.

DETAILED DESCRIPTION OF THE EMBODIMENTS

The technical scheme in the embodiments of the present disclosure will be clearly and completely described with reference to the drawings hereinafter. Obviously, the described embodiments are only some embodiments of the present disclosure, rather than all of the embodiments. Based on the embodiments in the present disclosure, all other embodiments obtained by those skilled in the art without paying creative labor belong to the scope of protection of the present disclosure.

The present disclosure aims to provide a path tracking method and device for an in-oil inspection robot for a storage tank bottom plate in an invisible environment, which can realize automatic path planning and tracking of an in-oil inspection robot for a storage tank, thereby greatly improving inspection efficiency.

In order to make the above objects, features and advantages of the present disclosure more obvious and understandable, the present disclosure will be further described in detail with reference to the drawings and the detailed description.

Embodiment 1

Embodiment 1 of the present disclosure provides a path tracking method for an in-oil inspection robot for a storage tank bottom plate in an invisible environment.

Figure 2A:
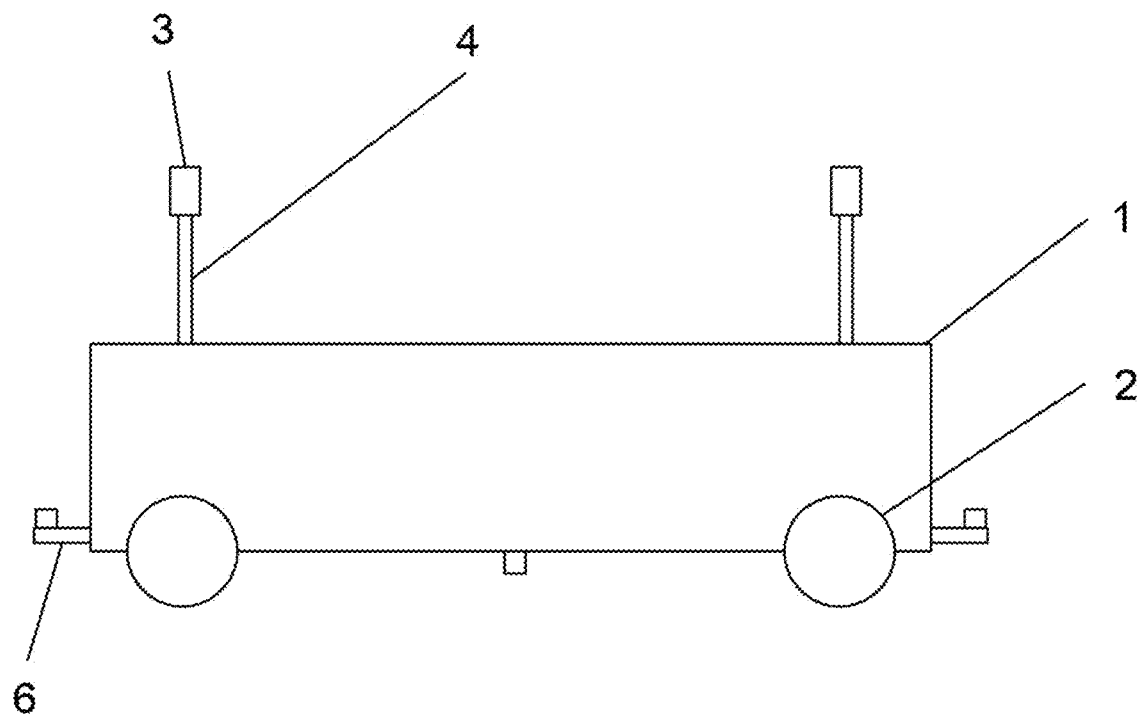
FIG. 2A is a side view of the in-oil inspection robot for the storage tank bottom plate according to an embodiment of the present disclosure.
Figure 2B:
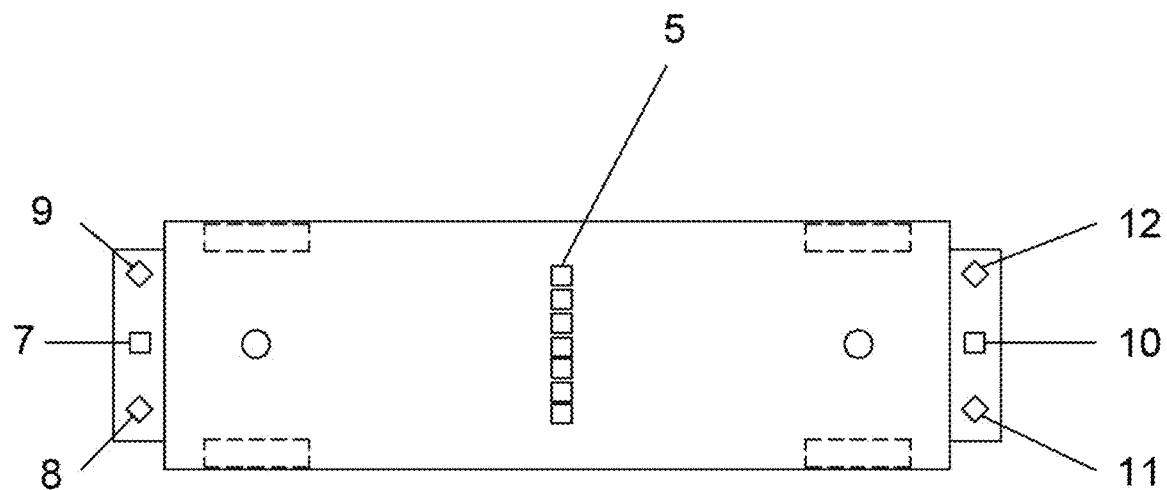
FIG. 2B is a bottom view of the in-oil inspection robot for the storage tank bottom plate according to the embodiment of the present disclosure.

The overall structure of the in-oil inspection robot for the bottom portion of the storage tank according to the embodiment of the present disclosure is shown in FIGS. 2A and 2B. The main body 1 of the robot is a cuboid body, in which a pair of driving wheels 2 are provided in the front and a pair of driving wheels 2 are provided in the rear, and the robot turns based on the speed difference between the left and right driving wheels 2. The positioning module includes ultrasonic transmitters 3 in the front and the rear, which depends on support rods 4 for raising and lowering. The inspection sensor is located in the center of the bottom portion of the main body 1 of the robot. A plurality of inspection sensors are arranged from left to right to form an inspection sensor array 5, allowing the robot to scan the bottom plate with the width equal to that of the inspection sensor array 5 when traveling straight. The obstacle avoidance sensor array includes two groups of obstacle avoidance sensors located at the front and rear ends of the robot, which are installed on brackets 6 extending from the main body 1 of the robot. One group includes front obstacle avoidance sensor 7, left front obstacle avoidance sensor 8 and right front obstacle avoidance sensor 9. Another group includes rear obstacle avoidance sensor 10, left rear obstacle avoidance sensor 11, right rear obstacle avoidance sensor 12. Each group of obstacle avoidance sensors consists of three ultrasonic distance sensors installed in different directions, which can scan the ground obstacles within a certain distance in the directions of −45°, 0°, and 45° downward in the front and back directions.

As for the positioning method and the obstacle avoidance method of the robot in the path tracking process, only a simple principle introduction is made in the present disclosure, which is not taken as the protection content.

The ultrasonic transmitter realizes positioning by transmitting low-frequency ultrasonic pulses. The pulses are captured by the annular array of receivers installed at the same height on the outer wall of the storage tank after being transmitted, and the propagation distance of acoustic signals is calculated according to the arrival time. Finally, the robot position is determined by three-point positioning.

The obstacle avoidance sensor includes a piezoelectric resonator. When the piezoelectric resonator receives an alternating current pulse signal, a mechanical vibration is generated. The vibration will result in an acoustic wave, which can be used to inspect short-range obstacles. After the acoustic wave is reflected by the front obstacle back to the sensor, the amplitude and the period of the characteristic signal of the original low-frequency pulse signal change, thus inferring the distance from the front obstacle to the obstacle avoidance sensor. The obstacle avoidance sensor can scan obstacles in a small-angle sector-shaped area right in front of the sensor, and the inspection distance is within 0.5 meters.

Figure 1:
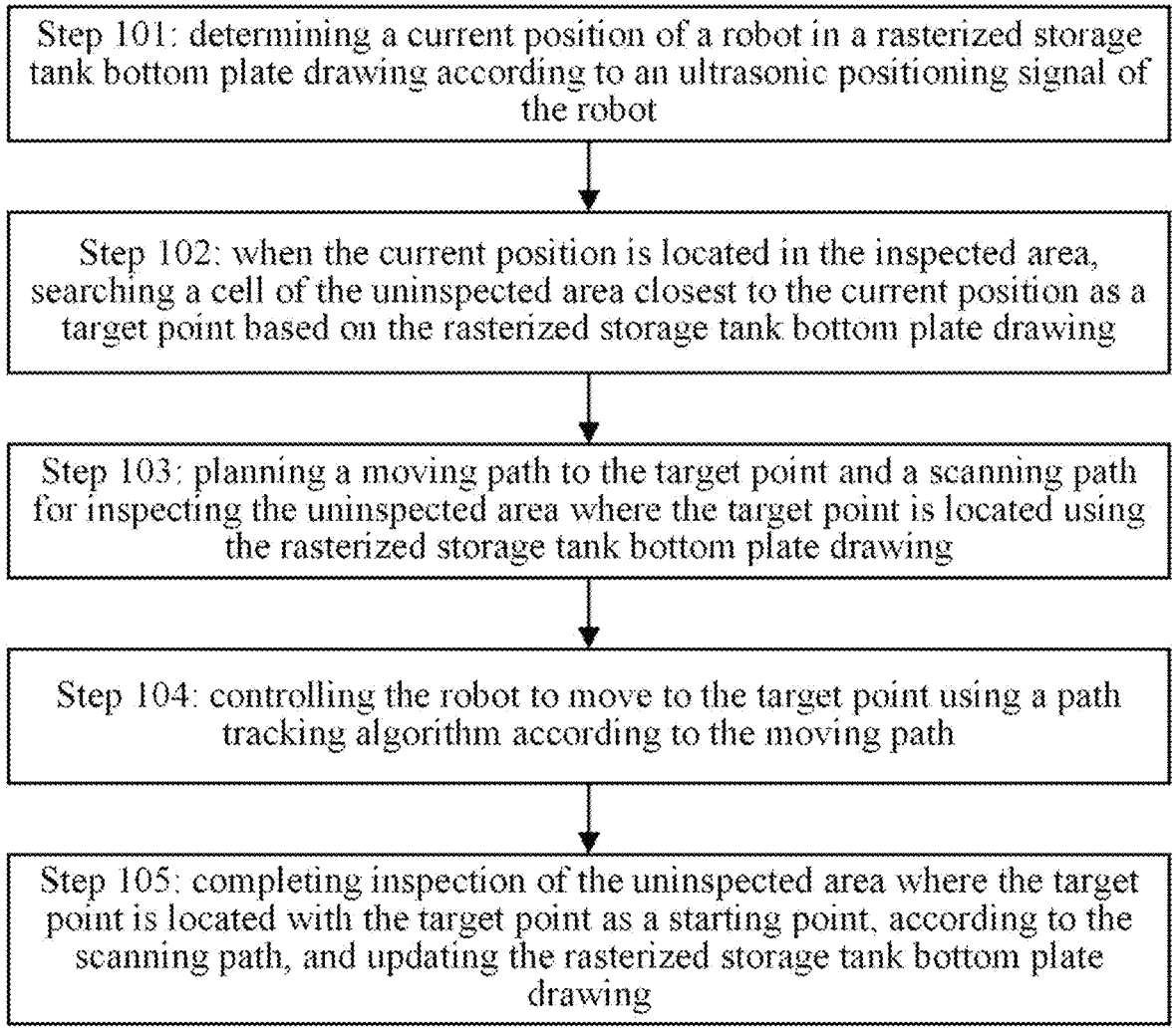
FIG. 1 is a schematic flow chart of a path tracking method for an in-oil inspection robot for a storage tank bottom plate according to Embodiment 1 of the present disclosure.

As shown in FIG. 1, the method includes steps 101-105.

In step 101, a current position of a robot in a rasterized storage tank bottom plate drawing is determined according to an ultrasonic positioning signal of the robot. The rasterized storage tank bottom plate drawing is marked with an impassable area, an inspected area and an uninspected area.

In the embodiment of the present disclosure, the rasterized storage tank bottom plate drawing is established in the following manner.

In the embodiment of the present disclosure, the width of the inspection sensor array is set to l, and the diameter of the storage tank is set to D. The storage tank area is divided into $N^2$ grids, and each grid is a cell, where N=D/l, which is rounded up. The result is stored in the map matrix S, and both the indexes of the row vectors and the column vectors of the matrix are 1 to N. The way to determine whether a cell is inside or outside is to determine whether the center of the cell is within a circle.

If the distance δ is greater than zero, the cell is outside the circle, which is marked as the impassable area "9". Otherwise, the cell is marked as the uninspected area "0". δ is expressed as formula (1) and formula (2):

$$\delta = (x - x_{n''})^2 + (y - y_{n''})^2 - 0.25D^2, \quad (1)$$

$$x_{n''} = l\left(n_x - \frac{N+1}{2}\right), \ y_n = l\left(n_y - \frac{N+1}{2}\right), \quad (2)$$

where $x_{n''}$ and $y_{n''}$ are an abscissa and an ordinate of an $n''^{th}$ cell, respectively, $n_x$ and $n_y$ are the cell numbers of the abscissa and the ordinate of the $n''^{th}$ cell, respectively, and x and y are an abscissa and an ordinate of a grid center, respectively.

In the case that the user of the storage tank can provide accurate drawings, the obstacles are input into the rasterized uninspected area in the form of impassable area identifier "9" according to the grid size. After converting obstacles into basic figures, such as circles, ellipses, rectangles or squares, whether obstacles are in the center of a cell using the algebraic equation of the obstacles.

The inspection path is not preset at the beginning of inspection. After the robot is hoisted into the storage tank through a manhole of the storage tank, its current position A can be determined by starting the ultrasonic transmitter.

In step 102, when the current position is located in the inspected area, a cell of the uninspected area closest to the current position is searched as a target point based on the rasterized storage tank bottom plate drawing. The following steps are not the actual movement process of the robot, but the simulation process of the robot in a memory in advance.

Figure 3A:
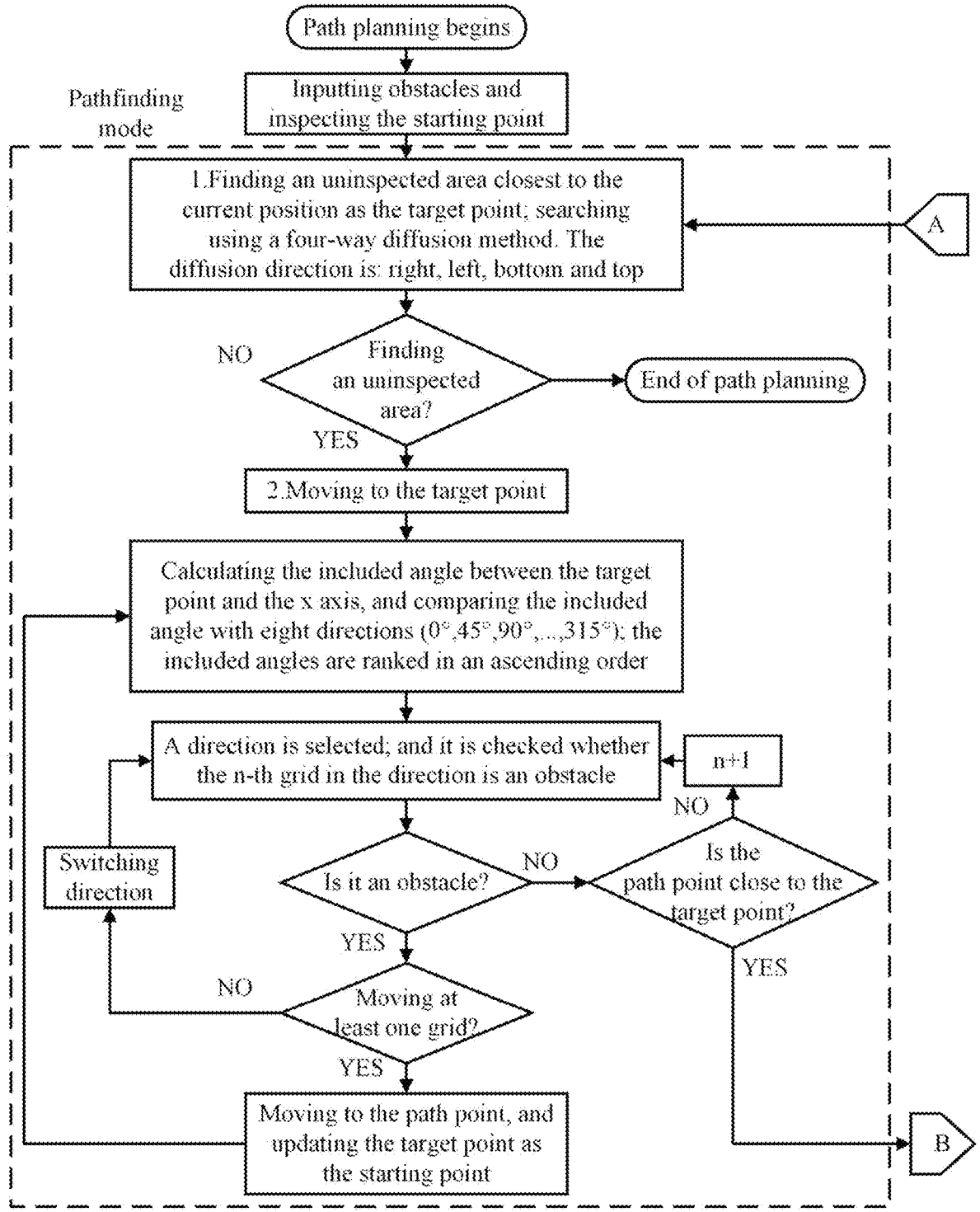
FIGS. 3A and 3B together form a flow chart of a path planning algorithm according to an embodiment of the present disclosure.
Figure 3B:
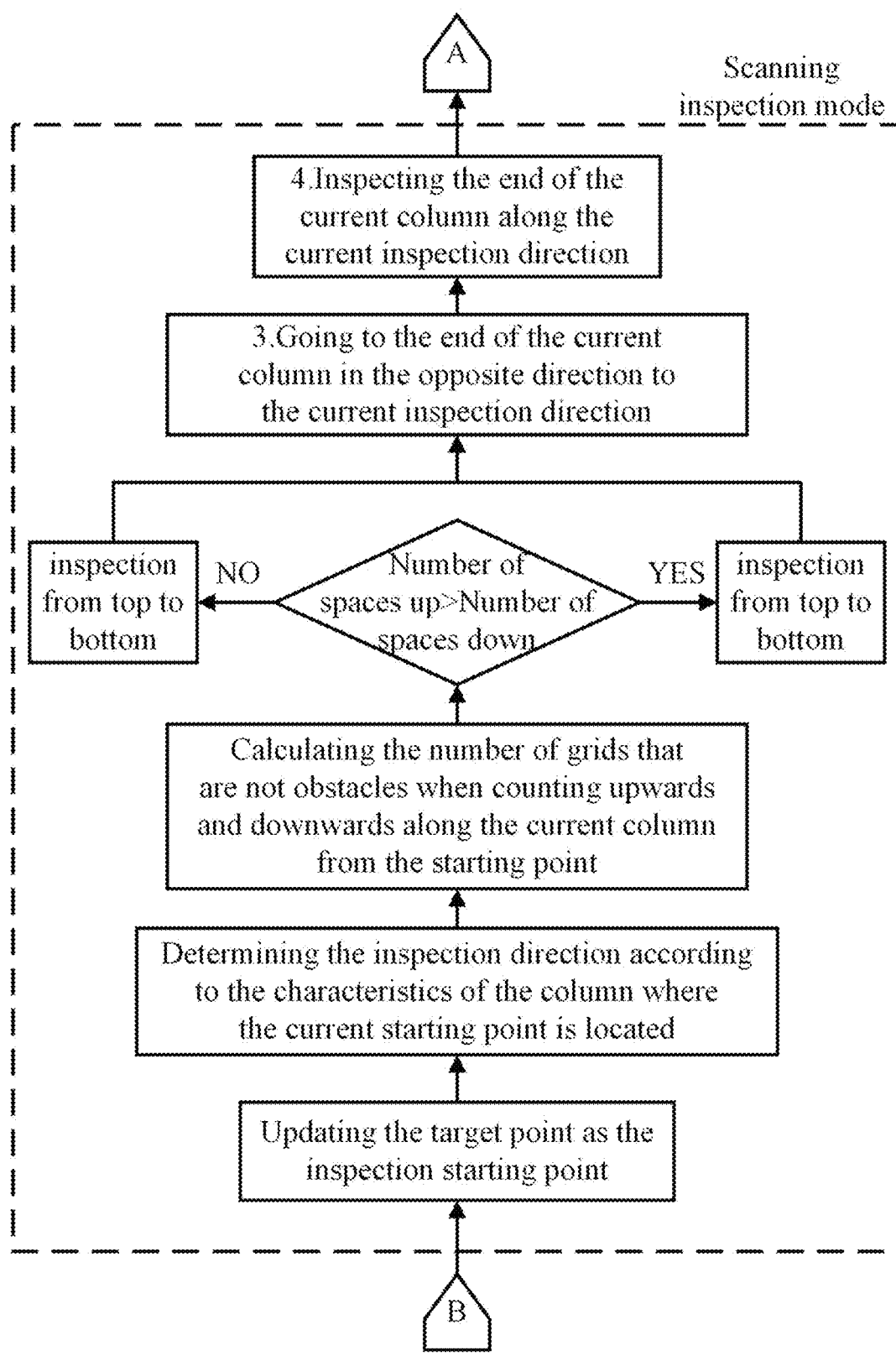

According to the impassable area and the uninspected area in the map matrix S, a path that can traverse the uninspected area is determined, and the algorithm is shown in FIGS. 3A and 3B. The path generation algorithm is roughly divided into two steps, a pathfinding mode and a scanning mode. In the pathfinding mode, the robot takes the current inspected area "1" as the starting point to find the uninspected area "0" closest to itself and moves to the uninspected area while avoiding obstacles. In the scanning mode, the robot starts from the current uninspected area, scans in the column direction between the impassable areas "9" from top to bottom or from bottom to top, and then returns to the pathfinding mode after reaching the end.

The inspection direction is determined, and the robot moves to the end of the column. After arriving at the new "area 0", the characteristics of the area in the current column are confirmed instead of the area being inspected immediately. If the number of cells in the downward non-"area 9" from the current position is greater than the number of cells in the upward non-"area 9", the area is inspected from top to bottom. Otherwise, the area is inspected from bottom to top. After that, the robot moves to the end of the column in the opposite direction of the inspection direction, and then inspects the area along the inspection direction.

If the left or right area is an obstacle, the robot moves to the left or right to enter the next column according to the rules of the pathfinding mode. Hereafter, the inspected area is referred to as "area 1", the uninspected area as "area 0" and the impassable area as "area 9".

The specific steps to search the uninspected area are as follows.

When the robot is located in "area 1" and the right, left, bottom and top thereof are not "area 0", the "diffusion method" is used to search the first uninspected "area 0", as shown in FIG. 4B. The priority of the eight-way finding is a→b→c→d→e→f→g→h, as shown in FIG. 4A. The current area is selected as the center, and according to the priority of right, left, bottom and top, the states of eight points are checked in the block area outside the center point in the order of lower-right (a), upper-right (b), lower-left (c), upper-left (d), down then right (e), down then left (f), up then right (g) and up then left (h); four positive directions (i.e. right, left, bottom, and top) will be repeated at the first diffusion in the current block, for example, the lower-right and upper-right are merged into one cell. If the points in eight directions are repeated in the corner of the block in the subsequent diffusion, there is no need to search. After the first "area 0" is found, the search is completed. Otherwise, continue to search in the order of the above eight directions in the block consisted of several areas. After search of all areas in the current block has been completed, the search proceeds to the next block area outside the current block. Under special circumstances, after the robot has finished scanning the current column, the right areas is positioned as the target area in the order of right, left, bottom and top. If the right side is the impassable "area 9", the robot is positioned to the left areas in sequence.

In step 103, a moving path to the target point and a scanning path for inspecting the uninspected area where the target point is located are planned using the rasterized storage tank bottom plate drawing. The following steps are the simulation results of the robot in the memory.

Figure 5A:
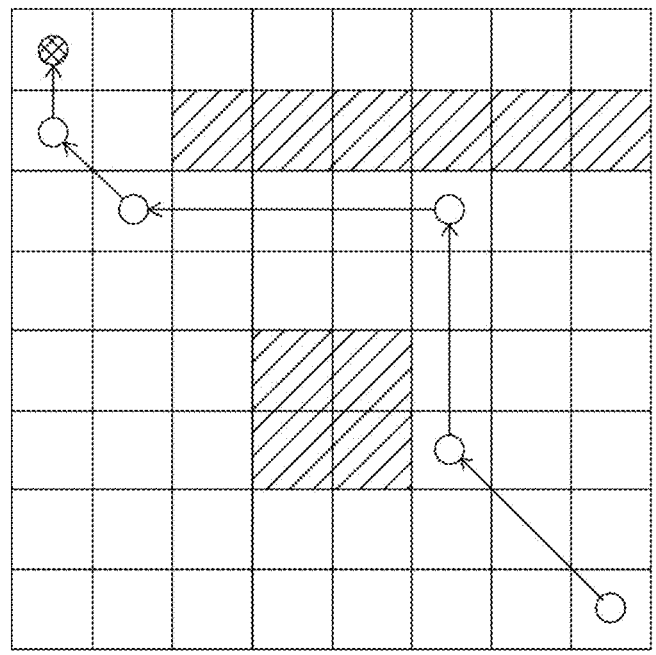
FIG. 5A is an exemplary diagram of movement of the in-oil inspection robot in a simple environment using an eight-way pathfinding method according to an embodiment of the present disclosure.
Figure 5B:
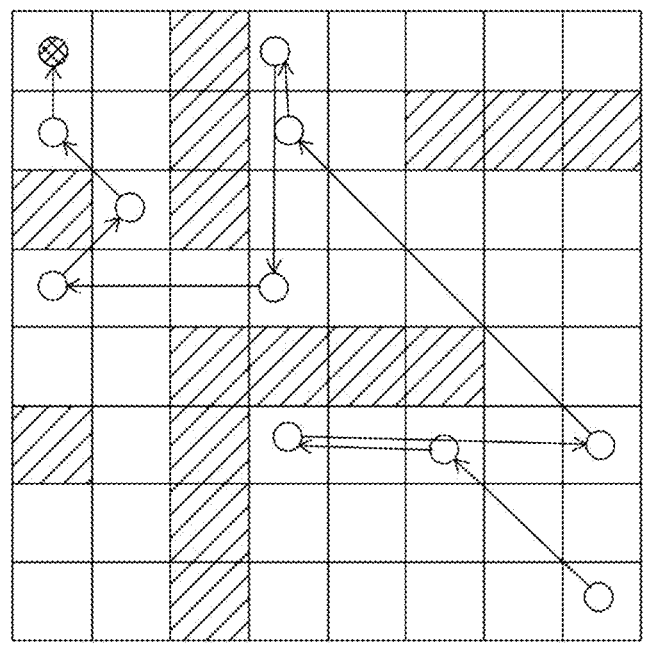
FIG. 5B is an exemplary diagram of movement of the in-oil inspection robot in a complex environment using the eight-way pathfinding method according to an embodiment of the present disclosure.

In the process of moving simulation, movement is performed according to the eight-way pathfinding method, as shown in FIGS. 5A and 5B. FIG. 5A shows movement of the robot in the simple environment. FIG. 5B shows movement of the robot in the complex environment. Taking the current position as the starting point, the included angle between the target point and the x axis is calculated, which is compared with eight directions (0°, 45°, 90°, . . . , 270°, 315°). The included angles are ranked in an ascending order. Thereafter, a direction with the minimum included angle and ranked first is selected to check if there are obstacles within n cells in the direction. If movement is available, movement to the end is performed. Otherwise, the direction is switched. After the movement, the new position is set as the starting point to enter the iteration.

The advantage of this method is high in calculation speed, and is suitable for scenes with a simple obstacle environment, especially scenes with few obstacles, such as the storage tank bottom plate with only sacrificial anode blocks and pipelines. However, in more complex scenes, the method requires a long time for pathfinding as each step only takes into account the environment in the surrounding n cells.

In step 104, the robot is controlled to move to the target point using a path tracking algorithm according to the moving path.

The robot starts to move according to the planned path. Path tracking can be subdivided into forwarding and rotation. When the current moving direction of the robot deviates greatly from the target point, the moving direction of the robot is corrected through a spin turn. Otherwise, the robot corrects the deviation while the robot is moving forward. It is assumed that the current position of the robot is A, the position of the previous path point, that is, the position of the path point before A, is $P_i$, and the position of the next path point, that is, the position of the path point after A, is $P_{i+1}$. If the included angle θ between the vector $AP_i$ and the vector $P_iP_{i+1}$ is greater than the included angle threshold $\theta^{th}$, enter the rotation mode. The formula of calculating the deviation angle error θ is:

$$\cos\theta = \frac{u_1v_1 + u_2v_2}{\sqrt{u_1^2+v_1^2}\sqrt{u_2^2+v_2^2}},$$

where $(u_1, v_1)$ is a vector $P_iA$, and $(u_2, v_2)$ is a vector $P_iP_{i+1}$.

The steps of the rotation mode are as follows: the robot stops moving first, and then the included angle α between the vector $AP_{i+1}$ and the vector $P_iP_{i+1}$ is calculated. The angle that the robot needs to rotate is (θ+α). The main control board in the robot is equipped with an inertial navigation sensor, which can accurately measure the three-dimensional acceleration and the angular acceleration of the movement of the robot. The steering angle of the robot can be calculated by periodic accumulation of the angular acceleration. However, because the refresh rate of the sensor is not enough to fully record the angular acceleration change resulted from the vibration caused by the robot during rotation, an error occurs in the steering angle, which is specifically shown as the nonlinear steering angle change during rotation at a constant speed. Therefore, the steering angle must be compensated.

The steering angle change in the steering process can be divided into three stages: a starting stage, a normal steering stage and an abnormal steering stage. The angle to be rotated is $\beta_{final}=\alpha+\theta$, and the compensation method of the steering angle is as follows.

The starting stage: first, the steering angle returns to zero, and the steering angle starts to be recorded, and then the robot starts steering. The rotation speed slowly rises from zero to a constant speed, and the abnormal vibration will not occur at this stage with a short time and a slow speed.

Figure 6:
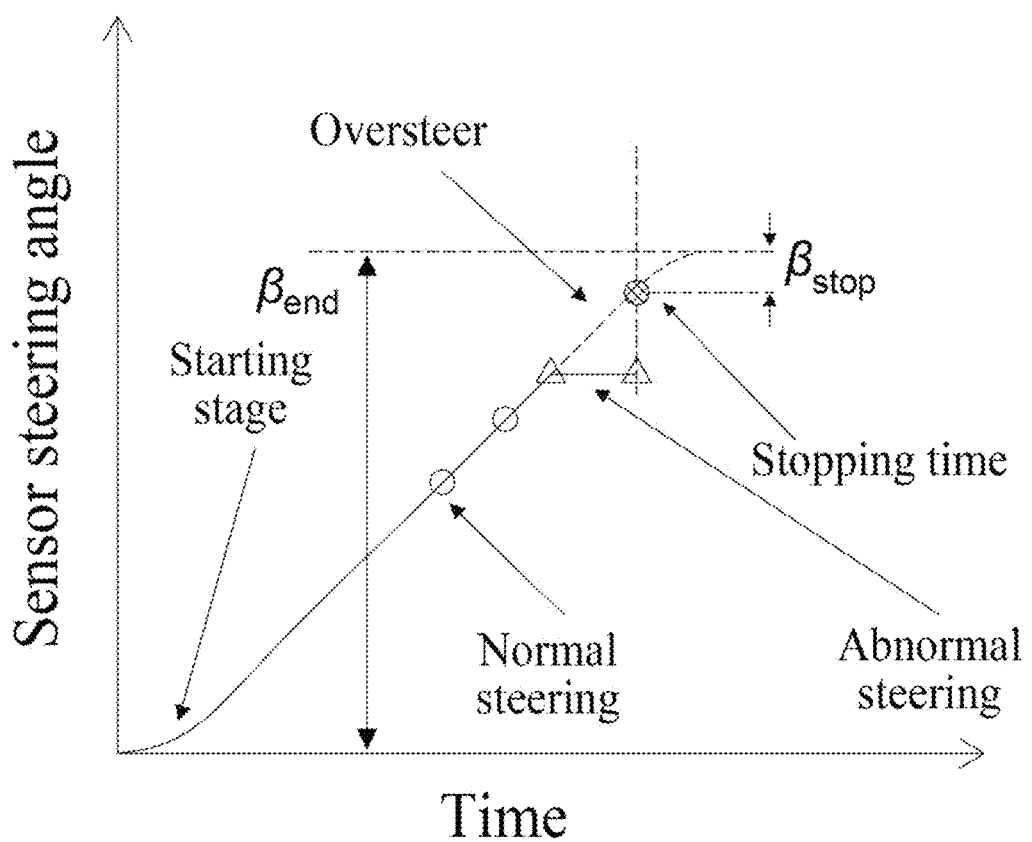
FIG. 6 is a schematic diagram of determining abnormal steering angle according to an embodiment of the present disclosure.

The normal steering stage: at this time, the steering angle increases linearly, and the steering angle slope starts to be monitored. If the change of the slope $\omega_s$ between the $s^{th}$ data point and the $p^{th}$ data point exceeds the previous recorded slope (that is, the slope $\omega_{s-1}$ between the $(s-1)^{th}$ data point and the $p^{th}$ data point) by a certain percentage, it is considered that there is an anomaly, as shown in FIG. 6, which can be denoted as:

$$\frac{\omega_s - \omega_{s-1}}{\omega_{s-1}} > K_\beta,$$

where $K_\beta$ is an anomaly determination threshold.

$$\omega_s = \frac{\theta_s - \theta_p}{(s-p)\Delta t};$$

$\theta_s$ and $\theta_p$ are the steering angles recorded at the $s^{th}$ data point and the $p^{th}$ data point, respectively. Δt is a time interval between two adjacent data points. The $p^{th}$ data point is the data point where the robot is inspected to enter a constant speed state, and the $s^{th}$ data point is the data point where the robot enters the abnormal steering stage.

The abnormal steering stage: after it is determined that the steering is abnormal, the steering angle stops recording, stops steering, and is reset. The steering angle and the angular speed before the $s^{th}$ data point are used to correct the steering angle, and the expression is: $\beta_{end}^k=\beta_p^k+(s-p)\omega_p^k\Delta t+\beta_{stop}(\omega_s^k)$, where $\beta_{end}^k$ is a rotation angle at the $k^{th}$ time, $B_p^k$ is the rotation angle of the robot when the robot accelerates from the static state to the constant speed state in the $k^{th}$ rotation process, stop $(\omega_s^k)$ is an inertia rotation function of the robot for calculating the rotation angle of the robot when the robot changes from $\omega_s^k$ to the stopped state, $\omega_p^k$ is the rotation speed of the robot when the robot accelerates from the static state to the constant speed state in the $k^{th}$ rotation process, $\omega_s^k$ is the rotation speed of the robot when the robot enters the abnormal steering stage from the constant speed state in the $k^{th}$ rotation process, and $\Delta t$ is a time interval between two adjacent data points.

Steering enters the next round until the robot rotates to the angle to be rotated.

The steps of the forward mode are as follows.

Figure 7:
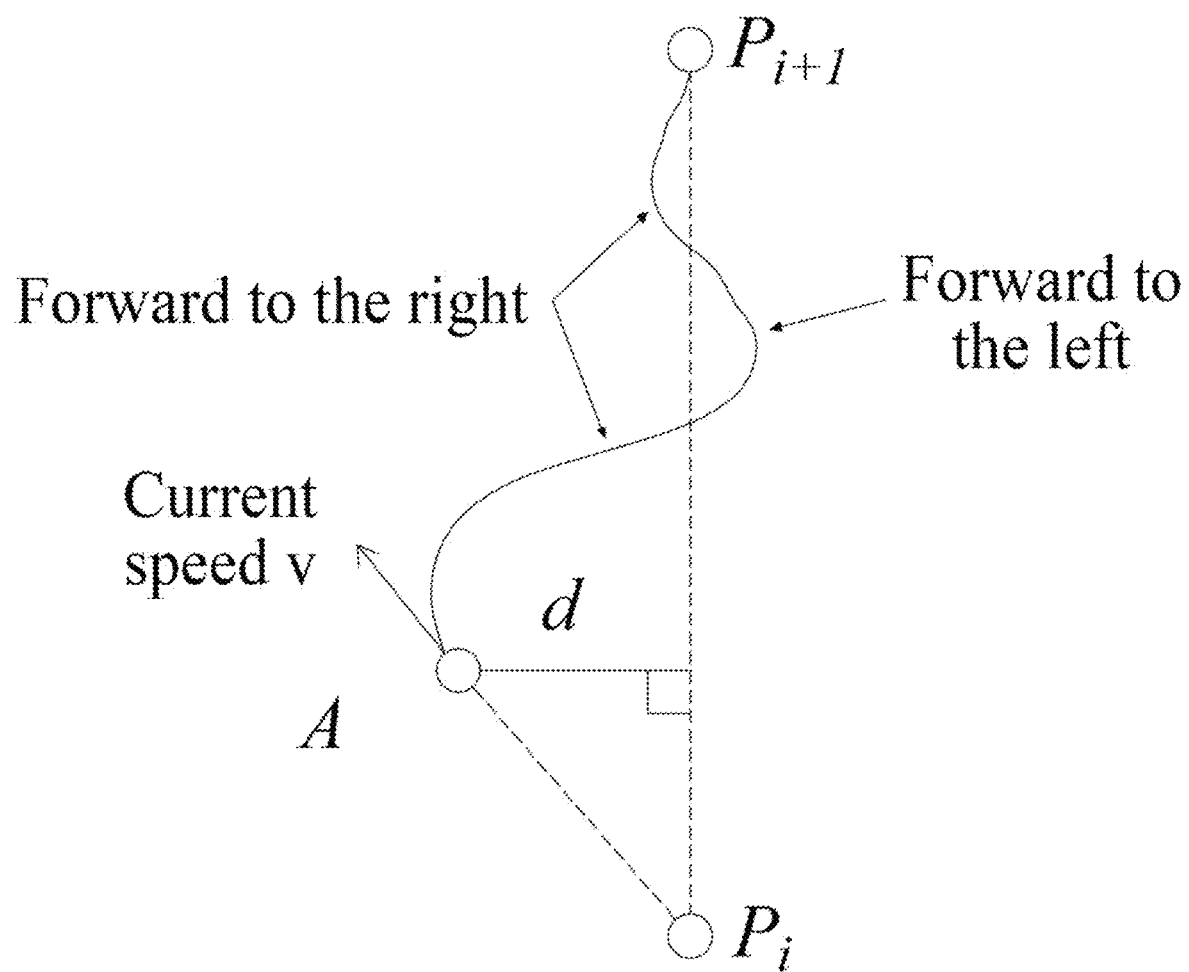
FIG. 7 is a schematic diagram of a tracking result of a straight forward path according to an embodiment of the present disclosure.

For a wheeled robot, when the left driving wheel and the right driving wheel rotate at the same speed, the robot moves forward. When the speed of the left driving wheel is faster, the robot turns to the right. When the speed of the right driving wheel is faster, the robot turns to the left. In the actual movement process, it is difficult for the robot to keep straight forward for various reasons, or the straight forward path will deviate from the planned path, as shown in FIG. 7. Therefore, it is necessary to take into account not only the method of correcting the deviation, but also the path tracking method.

Usually, the wheeled robot is steered by controlling the rotation speed of the driving wheel, that is, the robot moves straight forward when the rotation speed of the left driving wheel is equal to the rotation speed of the right driving wheel. However, due to mechanical, hardware, environmental and other factors, deviations occur between the left and right driving wheels, causing the robot to move in a skewed trajectory. The purpose of correcting the deviation is to eliminate the deviation movement resulted from the above factors when the robot is instructed to move straight ahead. Deviation is determined by the deviation angle error $\theta$ and the path vertical deviation d. The current position of the robot is A, the position of the previous path point is $P_i$, and the position of the next path point is $P_{i+1}$. The formula of calculating the path vertical deviation d is:

$$d = \begin{cases} \dfrac{kx_A - y_A + b}{\sqrt{k^2+1}}, & y_i \neq y_{i+1} \\ x_A - x_i, & y_i = y_{i+1} \end{cases};$$

where d is the path vertical deviation, k is the first-order coefficient, $$k = \frac{y_{i+1} - y_i}{x_{i+1} - x_i},$$

b is the constant coefficient, $b = y_i - kx_i$, $x_i$ and $y_i$ are an x-axis coordinate and a y-axis coordinate of the $i^{th}$ path point, $x_{i+1}$ and $y_{i+1}$ are an x-axis coordinate and a y-axis coordinate of the $(i+1)^{th}$ path point, and $x_A$ and $y_A$ are an x-axis coordinate and a y-axis coordinate of the current position.

The method of correcting the deviation includes mechanical deviation correction, hardware deviation correction and positioning point deviation correction. Mechanical deviation correction makes the corresponding left and right wheels move straight forward when they move on the flat ground by adjusting the outer diameter size of the left and right wheels and the height of the axles. The main purpose is to correct the manufacturing and installation errors of mechanical parts. Hardware deviation correction acquires the loads on the left and right sides of the robot by monitoring the power of the left motor and the right motor, and keeps the power of the left motor and the right motor equal in the process of straight forward by adjusting the rotation speeds of the left motor and the right motor. Positioning point deviation correction acquires the coordinates of the robot through acoustic positioning, and corrects the deviation angle error through the rotation speeds of the motor. In other words, positioning point deviation correction is the path tracking method when the robot travels along a straight line. Except for mechanical deviation correction, the other two deviation correction methods can acquire the deviation of the robot through the sensor in the traveling process of the robot, thus slowing down or correcting the deviation of the robot.

Hardware deviation correction and positioning point deviation correction have their own advantages and disadvantages, so that it is necessary to adjust the method of correcting the deviation immediately according to the measurement results of different sensors. The positioning point is positioned and obtained by the acoustic signal. Because there are some errors, it is necessary to improve the accuracy through the method of regression after a plurality of positioning, which is low in both timeliness and precision. In order to improve the response speed of the robot, hardware deviation correction is required to improve the response speed at which the robot corrects the straight path vertical deviation. However, due to the accumulative error, hardware deviation correction can only correct the influence of terrain on the left and right driving forces of the robot, but not the deviation error of the robot. To sum up, the present disclosure combines the above two methods. When the path vertical deviation d is low, hardware deviation correction is used to make the robot basically move along a straight line. When d is high, positioning point deviation correction is used to reduce $\theta$ and d, and then is switched back to hardware deviation correction until $\theta$ and d are reduced to the allowable range.

The specific method of hardware deviation correction is as follows.

When the path vertical deviation d calculated by the positioning point is less than the vertical deviation threshold $d_{max}$, and the power is unbalanced, hardware deviation correction starts to prevent the tendency of deviation. The power of the motor can be monitored by driving the motor controller, and the powers of the left and right motors are $\mathcal{P}_L$ and $\mathcal{P}_R$, respectively. The control variables are the rotation speeds of the left and right motors, which are $v_{l,t}$ and $v_{r,t}$, respectively.

The relationship between the control variable and the input variable is as follows: $v_{l,t} = V_t(1 + K\Delta\mathcal{P}_t)$, $v_{r,t} = V_t(1 - K\Delta\mathcal{P}_t)$; where $v_{l,t}$ and $v_{r,t}$ are the rotation speeds of the left and right motors in the $t^{th}$ round of control, $V_t$ is the input variable of the speed in the $t^{th}$ round of control, the parameter K is the open-loop control parameter, and $\Delta\mathcal{P}_t$ is a power difference between the left and right motors in the $t^{th}$ round of control, $\Delta\mathcal{P}_t = \mathcal{P}_L - \mathcal{P}_R$.

The above expression allows the left and right motors to change continuously according to the current power difference in each round of control. When the load on the left side of the robot increases, the robot deviates to the left, while the power $\mathcal{P}_L$ of the left motor increases, and $\Delta\mathcal{P}_t$ is positive. At this time, increasing $v_{l,t}$ and decreasing $v_{r,t}$ improve the left driving force and reduce the right driving force such that the trend that the robot deviates to the left becomes slow down until the robot finally moves straight according to the actual input variable with a slightly higher left speed.

The method of positioning point deviation correction is as follows.

When the path vertical deviation d calculated by the positioning point is greater than the vertical deviation threshold $d_{max}$, and the deviation angle error θ is less than the deviation angle error threshold $θ_{max}$, the forward path of the robot is corrected by the positioning point. In order to correct the path vertical deviation d, the PID control is used, and the rotation speeds of the left and right motors of the robot are adjusted, so that d is close to 0. In each round of control cycles, the numerical value $d_t$ of the path vertical deviation in the current round, the numerical value $d_{t-1}$ of the path vertical deviation in the previous round, and the accumulative error $d_{sum}$ in t rounds of control cycles are recorded, respectively. The control variable $f_t$ in the $t^{th}$ round of control can be expressed as: $f_t = Pd_t + I\Sigma d_t + D(d_t - d_{t-1})$; where P, I and D are proportional, integral and differential parameters, respectively. $f_t$ denotes the difference between the rotation speeds of the left and right motors of the robot in the $t^{th}$ round of control, and the value is between −1 and +1. When $f_t$ is less than 0, the robot deviates to the left, and when $f_t$ is greater than 0, the robot deviates to the right.

The rotation speeds $v_{l,t}$ and $v_{r,t}$ of the left and right motors of the robot can be expressed as: $v_{l,t} = V_t(1-f_t)$ and $v_{r,t} = V_t(1+f_t)$. When the robot deviates to the left with a small deviation error, $f_t$ is a small negative number, $v_{l,t}$ increases, $v_{r,t}$ decreases, and the robot will start to move to the right.

Because the PID control method takes the path vertical deviation as the input variable, when the path vertical deviation d of the robot becomes 0, the moving direction may still be oblique and not move forward along the planned path immediately. Finally, the motion trajectory is an oscillation curve based on the planned moving path. The convergence speed of the oscillation curve can be improved by adjusting PID parameters. The method of increasing the convergence speed is the same as the common PID control algorithm. That is, the proportional parameter P is first increased until a curve with large-amplitude oscillations that eventually converges is formed. Thereafter, the differential parameter D is increased until the convergence speed of oscillation is increased. Finally, the integral parameter I is increased to reduce the path vertical deviation d during steady motion.

Figure 8:
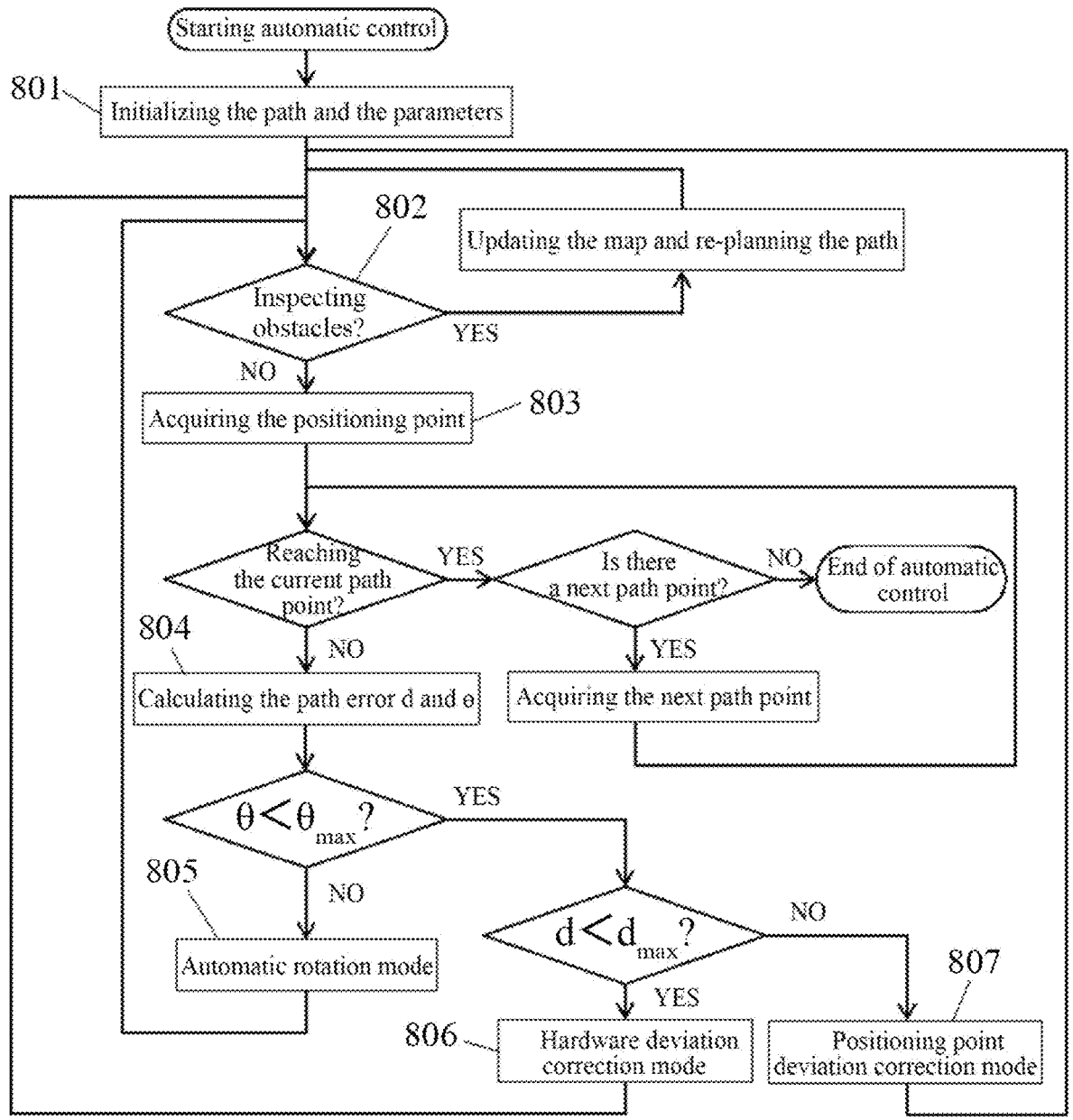
FIG. 8 is a flow chart of a path tracking algorithm according to an embodiment of the present disclosure.

As shown in FIG. 8, the overall flow of the path tracking algorithm includes steps 801-807.

In step 801, initialization is performed. According to the size of the storage tank and the known obstacles, the regional map matrix S is established and the path is generated. In addition, according to the test results, the control parameters K, P, I and D are initialized.

In step 802, obstacles are inspected. The robot periodically reads data from six ultrasonic distance sensors located in the front and the rear. If an unmarked obstacle is inspected, the obstacle is marked into the map matrix S according to the relative positions of the robot and the obstacle. After that, the path is regenerated. If the obstacle avoidance sensor does not inspect the obstacle or the obstacle has been marked on the map matrix S, the process proceeds to step 803.

In step 803, a positioning point and a path point are acquired. The ultrasonic transmitter of the robot is activated, and transmits a positioning signal and wait for a signal from the receiver. After more than three receivers capture the pulse signal, the current position of the robot (i.e., the positioning point) can be calculated according to the three-point positioning method. If the positioning error is obvious, the noise can be reduced by averaging a plurality of positioning points or regression. After the positioning point is confirmed, the positioning point is compared with the current path point. If the distance between the positioning point and the current path point is far less than the allowable path error, it is considered that the robot has reached the current path point and starts to load the next path point. Otherwise, the process proceeds to step 804.

In step 804, the path error is calculated. The path tracking mode is determined by the path error, including the deviation angle error θ and the path vertical deviation d. According to the deviation angle error threshold $θ_{max}$ and the vertical deviation threshold $d_{max}$, the path tracking mode is determined, including the rotation mode (step 805), the hardware deviation correction mode (step 806) and the positioning point deviation correction mode (step 807).

In step 805, the rotation mode is performed. When the path point reached by the robot is a corner, or the robot has a large deviation while travelling, the rotation mode starts to adjust the travelling direction of the robot in site. Through angular speed comparison and repeated attempts, the interference of vibration on the inertial navigation sensor can be overcome, and the required angle can be rotated more accurately.

In step 806, the hardware deviation correction mode is performed. When the path vertical deviation d is low, the robot keeps the hardware deviation correction mode to move straight. By balancing the powers of the left and right motors, the robot can keep moving straight.

In step 807, the positioning point deviation correction mode is performed. When the path vertical deviation d is high, even though the robot is moving straight, the robot has accumulated a high error, which is required to be corrected by the coordinates of the positioning point.

In step 105, taking the target point as a starting point, the inspection of the uninspected area where the target point is located is completed according to the scanning path, and the rasterized storage tank bottom plate drawing and the map matrix S are updated.

Since the robot is in an invisible environment, the robot cannot inspect obstacles in the distance, but can only inspect whether there are obstacles in the six nearby directions around the robot body. Therefore, the surrounding environment is inspected by the obstacle avoidance sensor array in the moving process. Once an unmarked obstacle is found, the process proceeds to the obstacle handling procedure.

When one of the six obstacle avoidance sensors of the robot inspects an unmarked obstacle, the "area 0" is marked as "area 9" at the cell at the corresponding distance and the corresponding direction. At this point, a new path is regenerated. The specific process is as follows.

The inspector finds a new obstacle. The corresponding cell is determined according to the length, the width, the inspector angle and the target distance of the robot. It is searched from the current map matrix S about whether the cell is "area 9". In the case of being unmarked, the inspection stops. In particular, it is necessary to avoid the generation of closed obstacle areas. The areas include "area 0" at the center and "area 9" at the edge. The method of inspecting the closed area is as follows: after marking new obstacles, the area closed by obstacles is inspected by the "four-way seeding fill algorithm". The map matrix S is duplicated. Taking any point therein as the seed, and "area 0" and "area 1" are dyed into "area 9" in the order of right, left, bottom and top. If there is still "area 0" after dyeing, the "area 0" is dyed into "area 9" in the map matrix S with this point as the seed.

A new path is generated. The updated map matrix S' and the cell where the current robot is located are derived together with the inspected area "area 1". When regenerating the path, taking the area of the current robot as the starting point, the path is generated within the remaining "area 0".

In the inspection process, if the current uninspected area is inspected, the current uninspected area is marked as the inspected area on the drawing, and then the process returns to step 101 for searching next target point. After a new "area 1" cannot be found in the map matrix S by the diffusion method, the inspection is deemed to be completed. At this time, the robot is returned to the manhole position according to the eight-way pathfinding method.

It should be noted that in the embodiment of the present disclosure, step 101, step 102 and step 103 are all virtual processes, the robot does not move, and step 104 and step 105 are actual motion processes. A complete flow is as follows: a map is generated in step 101; step 102 and step 103 are repeatedly executed to generate a path; the movement starts, and step 104 and step 105 are repeatedly executed; after the obstacle is found, the map is updated, then the process returns to step 101, and step 102 and step 103 are repeatedly executed.

Embodiment 2

In this embodiment, the method mentioned in the present disclosure is specifically explained through a simplified storage tank model.

The diameter D of the storage tank is 14 meters, the width of the inspection sensor array of the robot is 1 meter, and the inspection range of the obstacle avoidance sensor is 0.5 meters.

At the beginning of inspection, the robot enters the storage tank from the manhole located in the area $s_{6,1}$, and enters the initialization stage, and enters step 101 for the first time. The area $s_{6,1}$ is the cell in the sixth row and the first column in FIG. 9 to FIG. 12.

Figure 9:
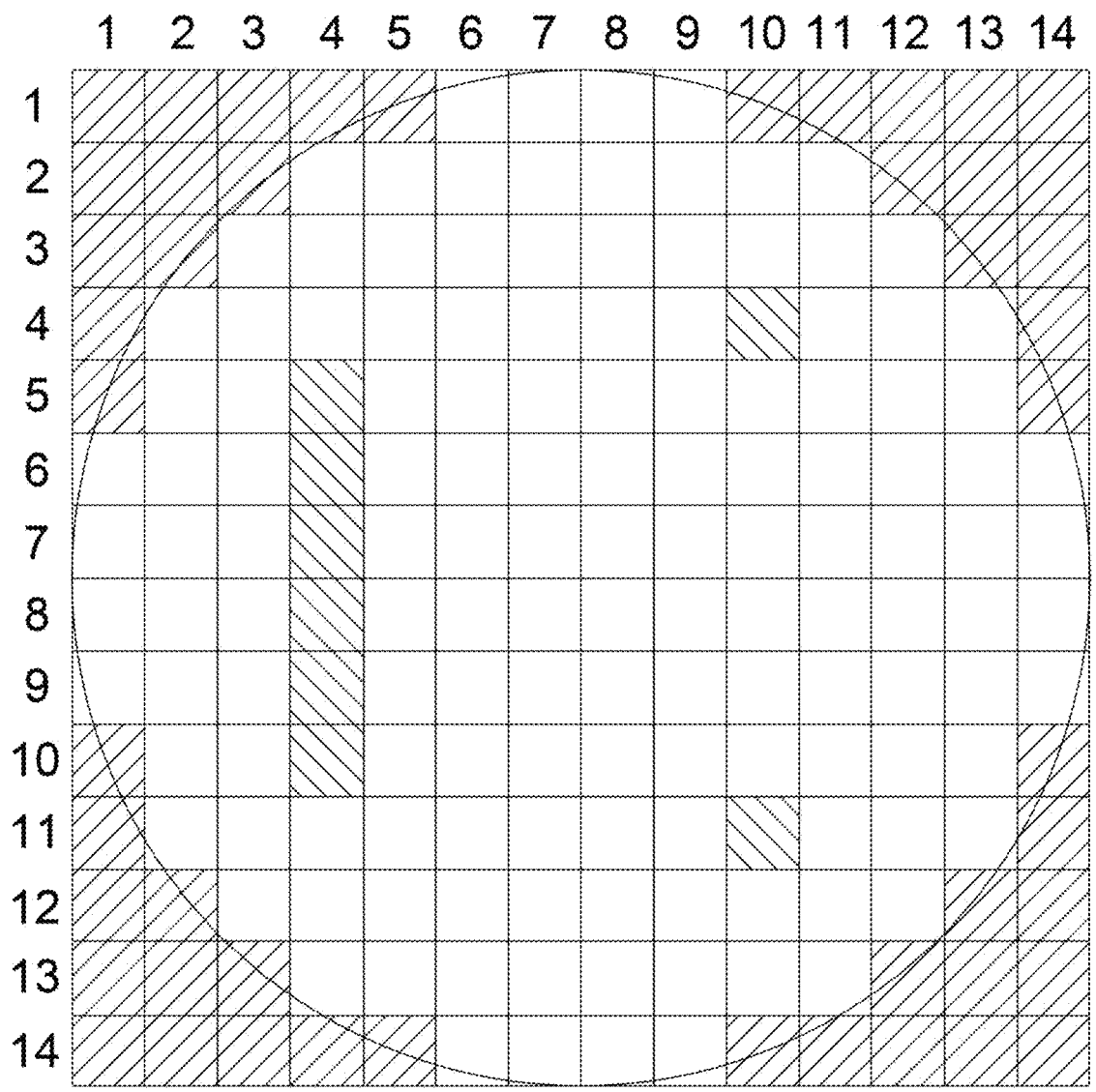
FIG. 9 is a diagram of a real grid according to an embodiment of the present disclosure.

In step 101, a rasterized storage tank bottom plate drawing is established, as shown in FIG. 9. Each area is a square with a side length of 1 meter. The forward slash area is located outside the storage tank and is defined as "area 9", and the white area is located inside the storage tank and is defined as "area 0". The initial map matrix S is:

$$S = \begin{bmatrix} 9 & 9 & 9 & 9 & 9 & 0 & 0 & 0 & 9 & 9 & 9 & 9 & 9 \\ 9 & 9 & 9 & 0 & 0 & 0 & 0 & 0 & 0 & 0 & 9 & 9 & 9 \\ 9 & 9 & 0 & 0 & 0 & 0 & 0 & 0 & 0 & 0 & 0 & 9 & 9 \\ 9 & 0 & 0 & 0 & 0 & 0 & 0 & 0 & 0 & 0 & 0 & 0 & 9 \\ 9 & 0 & 0 & 0 & 0 & 0 & 0 & 0 & 0 & 0 & 0 & 0 & 9 \\ 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 \\ 9 & 0 & 0 & 0 & 0 & 0 & 0 & 0 & 0 & 0 & 0 & 0 & 9 \\ 9 & 0 & 0 & 0 & 0 & 0 & 0 & 0 & 0 & 0 & 0 & 0 & 9 \\ 9 & 9 & 0 & 0 & 0 & 0 & 0 & 0 & 0 & 0 & 0 & 9 & 9 \\ 9 & 9 & 9 & 0 & 0 & 0 & 0 & 0 & 0 & 0 & 9 & 9 & 9 \\ 9 & 9 & 9 & 9 & 9 & 0 & 0 & 0 & 9 & 9 & 9 & 9 & 9 \end{bmatrix}.$$

The back slash areas in FIG. 9 are obstacles that actually exist but have not been identified, which are not marked in the initial map matrix S.

Figure 10:
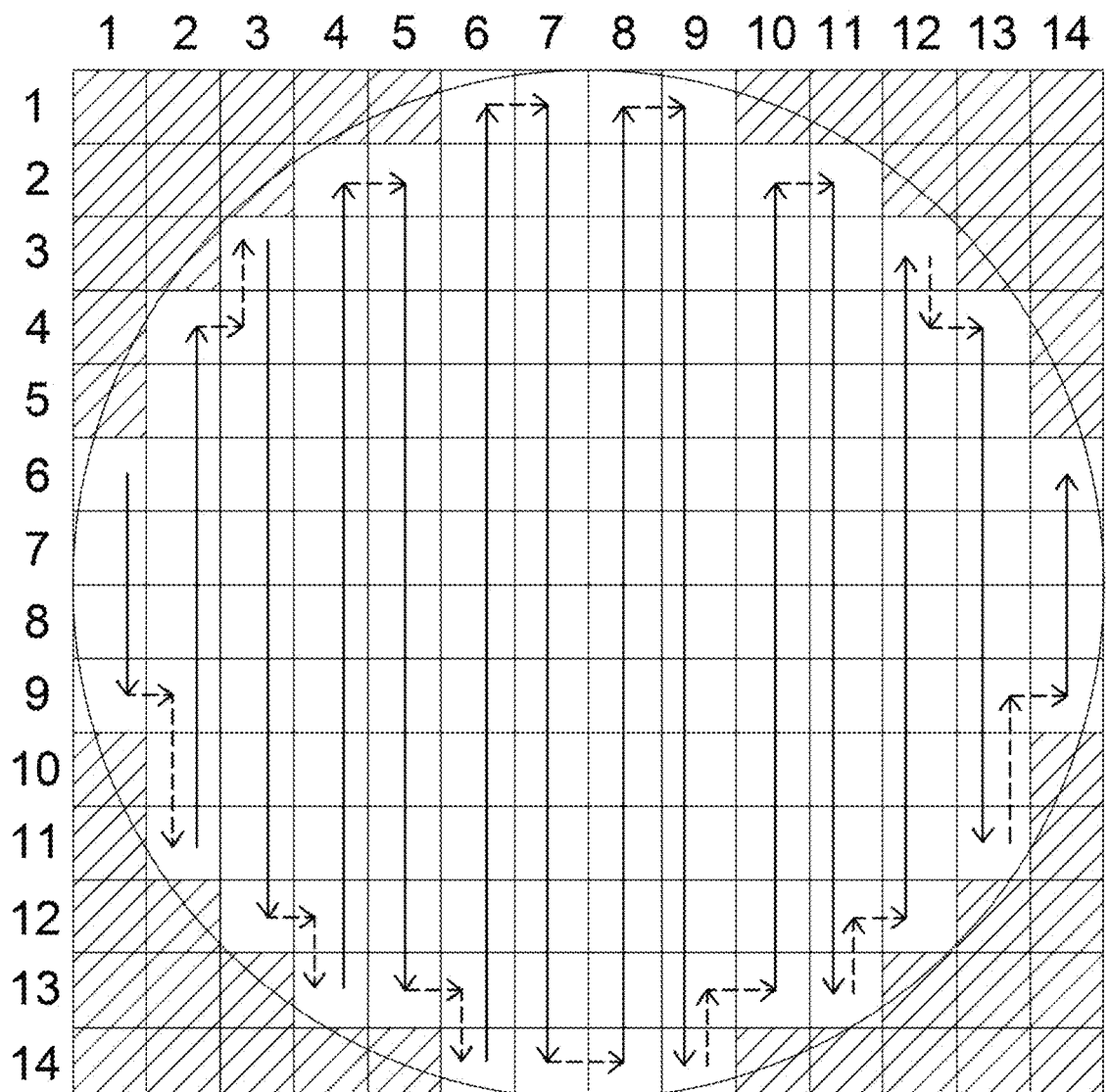
FIG. 10 is a diagram of planning an initial virtual path according to an embodiment of the present disclosure.

In step 102, a scanning path that traverses the uninspected area (i.e. "area 0") is initialized in the memory, as shown in FIG. 10. The steps of the path planning algorithm shown in FIGS. 3A and 3B are illustrated in detail hereinafter.

The robot is initially located in the "area 0" and jumps into the scanning mode. The scanning direction of the first column is determined from top to bottom. Since the area $s_{5,1}$ is "area 9", the robot jumps to step 4 of FIG. 3B to generate a sub-path of $s_{5,1}$ to $s_{9,1}$, where the subscripts of $s_{5,1}$ and $s_{9,1}$ has the following meaning: the number to the left of "," indicates the column, and the number to the right of "," indicates the row. The areas indicated by $s_{5,1}$ to $s_{9,1}$ are cells corresponding to rows and columns, which will not be explained hereinafter. Since the area $s_{9,1}$ is marked as "area 1", enter the pathfinding mode in step 1 of FIG. 3A. According to the four diffusion methods, the target area is determined as the rightmost area $s_{9,2}$.

In step 103, the path is planned to move to $s_{9,2}$. The process proceeds to step 2 of FIG. 3A, and paths $s_{9,1}$ to $s_{9,2}$ are generated.

Step 102 is repeatedly executed to enter the scanning mode, the characteristics of the second column is analyzed, and the scanning direction is determined from bottom to top. Proceed to step 3 of FIG. 3B to generate a path of $s_{9,2}$ to $s_{11,2}$. Proceed to step 4 of FIG. 3B, and an inspection path of $s_{11,2}$ to $s_{4,2}$ is generated.

By analogy, the initial traversal path $T_0$ is completed, that is, the scanning path. The expression is shown as follows.

$$T_0 = s_{6,1}, s_{9,1}, s_{9,2}, s_{11,2}, s_{4,2}, s_{4,3}, s_{3,3}, s_{12,3}, \\ s_{12,4}, s_{13,4}, s_{2,4}, * * *, s_{9,13}, s_{9,14}, s_{6,14}$$

In step 104, the robot moves along the planned traversal path $T_0$ in the memory using the path tracking algorithm. When the robot moves between areas $s_{6,1}$ to $s_{9,1}$, the robot enters the forward mode and uses the method of correcting the deviation such as the PID control method to keep the robot moving straight. After the robot moves to the area $s_{9,1}$, the acquired next area is $s_{9,2}$, and the planned path is 90 degrees different from the current orientation of the robot, so as to enter the rotation mode. After the rotation is completed, the robot enters the forward mode, and moves straight between areas $s_{9,1}$ and $s_{9,2}$. By analogy, the path tracking in the movement of the robot can be realized.

Figure 11:
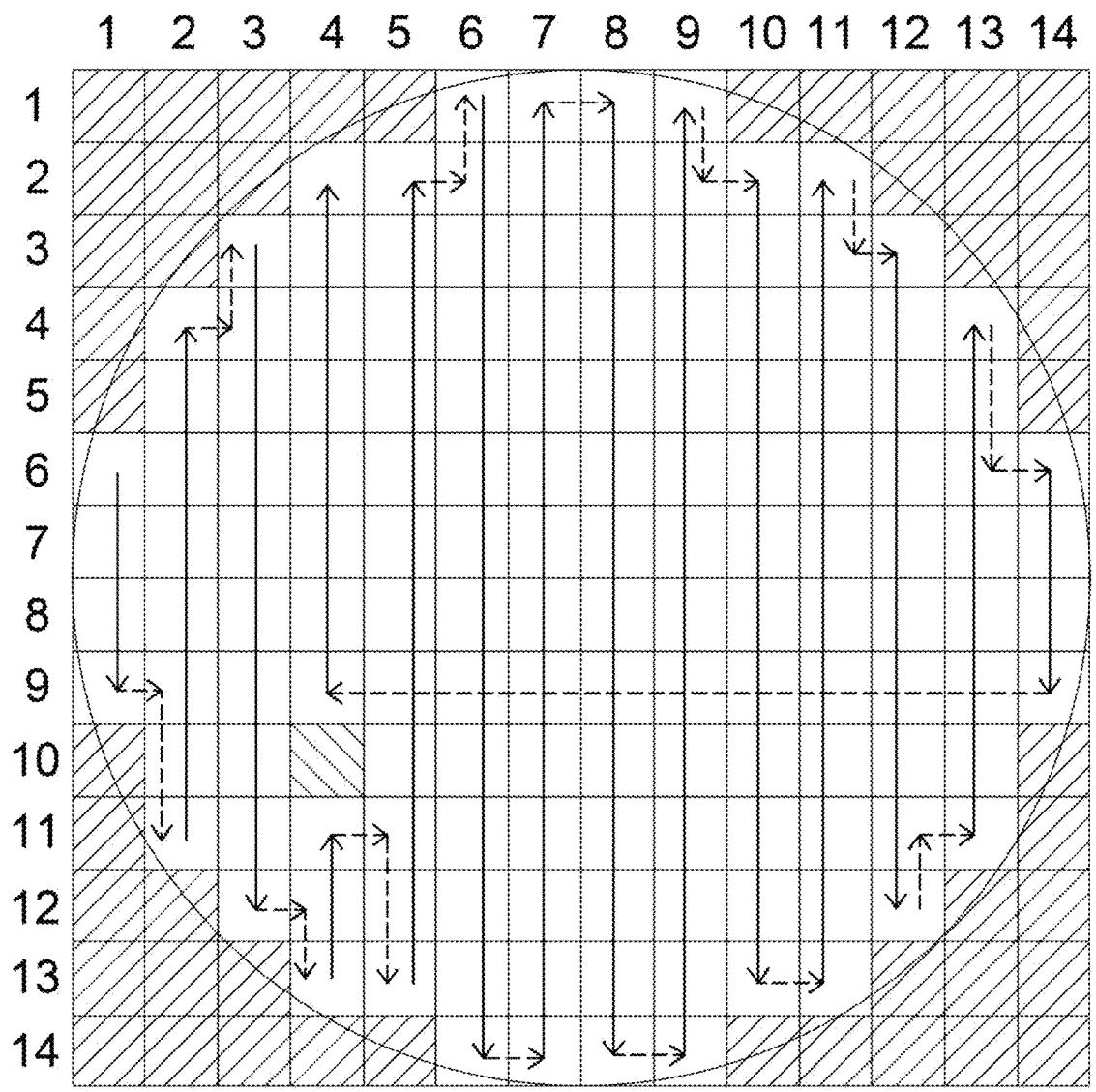
FIG. 11 is a diagram of planning a first updated virtual path according to an embodiment of the present disclosure.

In step 105, inspection is performed in the forward mode, and obstacles are continuously inspected. As shown in FIG. 11, when the robot moves from $s_{13,4}$ to $s_{2,4}$, the robot stops moving after the obstacle avoidance sensor inspects that there is an obstacle ahead in the area $s_{11,4}$. At this time, the map matrix S is shown in the following formula:

$$S = \begin{bmatrix} 9 & 9 & 9 & 9 & 9 & 0 & 0 & 0 & 9 & 9 & 9 & 9 & 9 \\ 9 & 9 & 9 & 0 & 0 & 0 & 0 & 0 & 0 & 0 & 9 & 9 & 9 \\ 9 & 9 & 1 & 0 & 0 & 0 & 0 & 0 & 0 & 0 & 0 & 9 & 9 \\ 9 & 1 & 1 & 0 & 0 & 0 & 0 & 0 & 0 & 0 & 0 & 0 & 9 \\ 9 & 1 & 1 & 0 & 0 & 0 & 0 & 0 & 0 & 0 & 0 & 0 & 9 \\ 1 & 1 & 1 & 0 & 0 & 0 & 0 & 0 & 0 & 0 & 0 & 0 & 0 \\ 1 & 1 & 1 & 0 & 0 & 0 & 0 & 0 & 0 & 0 & 0 & 0 & 0 \\ 1 & 1 & 1 & 0 & 0 & 0 & 0 & 0 & 0 & 0 & 0 & 0 & 0 \\ 1 & 1 & 1 & 0 & 0 & 0 & 0 & 0 & 0 & 0 & 0 & 0 & 0 \\ 9 & 1 & 1 & 9 & 0 & 0 & 0 & 0 & 0 & 0 & 0 & 0 & 9 \\ 9 & 1 & 1 & 1 & 0 & 0 & 0 & 0 & 0 & 0 & 0 & 0 & 9 \\ 9 & 9 & 1 & 1 & 0 & 0 & 0 & 0 & 0 & 0 & 0 & 9 & 9 \\ 9 & 9 & 9 & 1 & 0 & 0 & 0 & 0 & 0 & 0 & 9 & 9 & 9 \\ 9 & 9 & 9 & 9 & 9 & 0 & 0 & 0 & 9 & 9 & 9 & 9 & 9 \end{bmatrix},$$

where $s_{10,4}$ is marked as the impassable area "area 9".

Step 101 is repeatedly executed to update the map matrix S, and step 102 and step 103 are repeatedly executed to generate a new traversal path $T_1$. The new traversal path $T_1$ in the memory can be expressed as $T_1=[s_{11,4}, s_{11,5}, s_{13,5}, s_{2,5}, \ldots, s_{6,13}, s_{6,14}, s_{9,14}]$. After that, the robot is restarted, and step 104 and step 105 are repeatedly executed.

Figure 12:
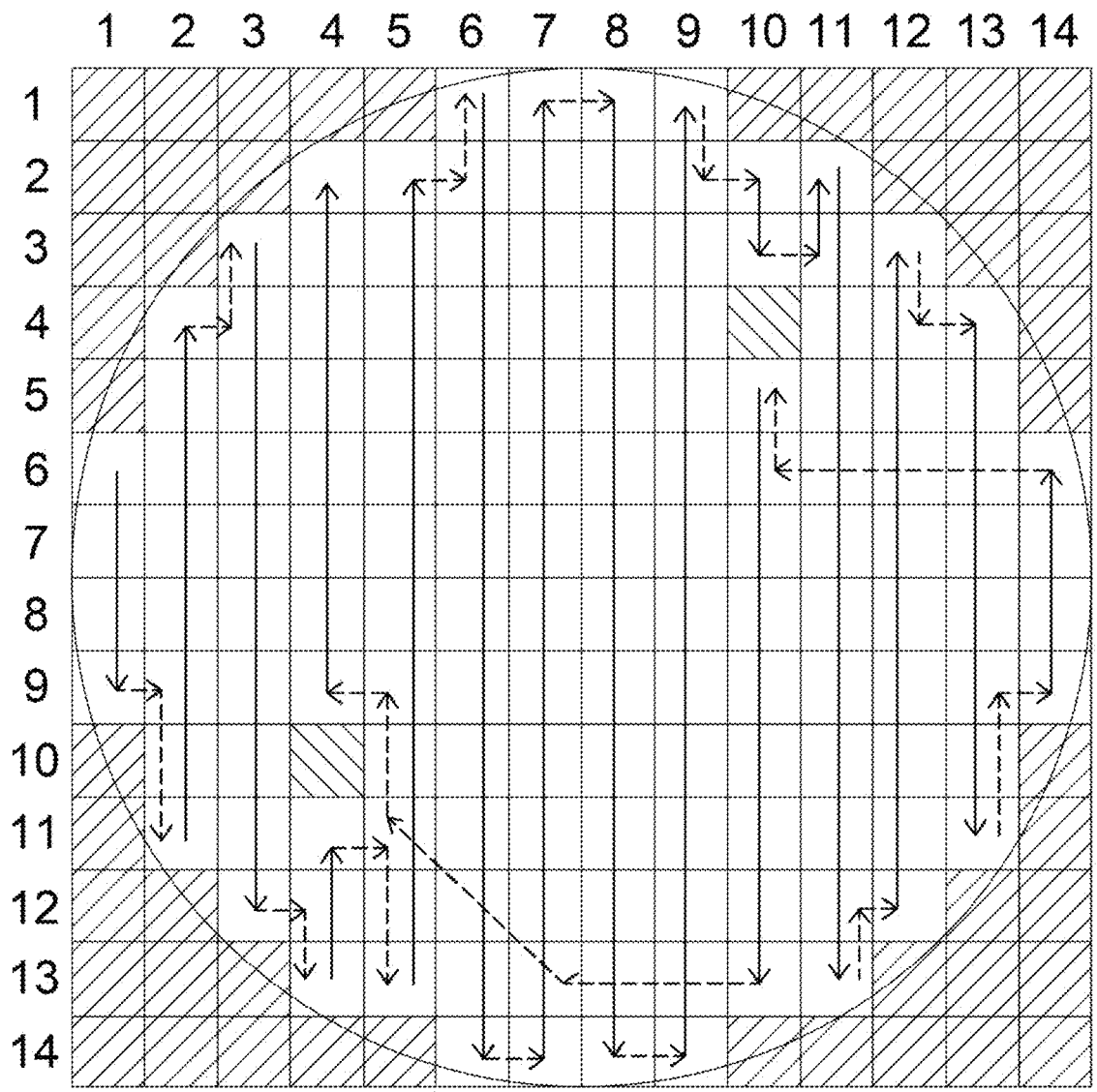
FIG. 12 is a diagram of planning a second updated virtual path according to an embodiment of the present disclosure.

As shown in FIG. 12, after the robot moves to the area $s_{3,10}$, the second obstacle is inspected, the front area $s_{4,10}$ is marked as "area 9", and a new traversal path $T_2$ is generated.

The subsequent processes can be deduced by analogy.

The present disclosure provides a path tracking algorithm by an in-oil inspection robot for a storage tank bottom plate, based on an obstacle avoidance sensor and an ultrasonic positioning module in an invisible environment. First, the regional traversal algorithm in an invisible environment provides a method of realizing map drawing, regional traversal and cross-regional movement by sensors in an invisible crude oil environment for a robot. In the actual exploration process of the robot, the robot can track the planned path by the path tracking algorithm, and use the proposed plurality of algorithms to correct the sensor errors that may occur in automatic control, such as the positioning signal deviation, the abnormal steering angle and the path vertical deviation. The present disclosure provides a feasible automatic inspection method for the in-oil inspection robot for the storage tank bottom plate, and has a great application prospect in the storage tank inspection engineering application.

The technical features of the above embodiments can be combined at will. In order to make the description concise, not all possible combinations of the technical features in the above embodiments are described. However, as long as there is no contradiction between the combinations of these technical features, the technical features should be considered as the scope described in this specification.

In the present disclosure, specific examples are used to illustrate the principle and the implementation of the present disclosure. The description of the above embodiments is only used to help understand the method and the core idea of the present disclosure. At the same time, for those skilled in the art, there will be changes in the detailed description and the application scope according to the idea of the present disclosure. In summary, the contents of this specification should not be construed as limiting the present disclosure.

What is claimed is:

1. A path tracking method for an in-oil inspection robot for a storage tank bottom plate in an invisible environment, comprising:

determining a current position of a robot in a rasterized storage tank bottom plate drawing according to an ultrasonic positioning signal of the robot, wherein the rasterized storage tank bottom plate drawing is marked with an impassable area, a inspected area and an uninspected area;

when the current position is located in the inspected area, searching a cell of the uninspected area closest to the current position as a target point based on the rasterized storage tank bottom plate drawing;

planning a moving path to the target point and a scanning path for inspecting the uninspected area where the target point is located using the rasterized storage tank bottom plate drawing;

controlling the robot to move to the target point using a path tracking algorithm according to the moving path; and completing inspection of the uninspected area where the target point is located with the target point as a starting point, according to the scanning path, and updating the rasterized storage tank bottom plate drawing;

wherein planning the moving path to the target point using the rasterized storage tank bottom plate drawing comprises:

assuming that a value of m is 1;

setting the current position as an $m^{th}$ starting point;

determining included angles between a direction of the $m^{th}$ starting point and the target point and all movable directions, and determining a movable direction with a minimum included angle as a target moving direction; wherein the movable directions are directions of eight directions of 0°, 45°, 90°, 135°, 180°, 225°, 270° and 315°, in which a next cell to the $m^{th}$ starting point does not belong to the impassable area;

determining whether there are impassable areas in n cells with the $m^{th}$ starting point as the starting point in the target moving direction, where n is a predetermined number of cells for a single planning;

when there is no impassable area, adding, to the moving path, a sub-path formed by moving the n cells in the target moving direction with the $m^{th}$ starting point as the starting point, and setting an $n^{th}$ cell in the target moving direction with the $m^{th}$ starting point as the starting point as an $(m+1)^{th}$ starting point;

when there is an impassable area, adding, to the moving path, a sub-path formed by moving n' cells in the target moving direction with the $m^{th}$ starting point as the starting point, and setting an $n'^{th}$ cell in the target moving direction with the $m^{th}$ starting point as the starting point as the $(m+1)^{th}$ starting point, where n' is a number of cells between a cell of the impassable area closest to the $m^{th}$ starting point in the target moving direction and the $m^{th}$ starting point; and increasing a value of m by 1, returning to the determining included angles between a direction of the $m^{th}$ starting point and the target point and all movable directions, and determining a movable direction with a minimum included angle as a target moving direction until the moving path connecting the current position and the target point is obtained.

2. The path tracking method for the in-oil inspection robot for the storage tank bottom plate in the invisible environment according to claim 1, wherein a method for searching the cell of the uninspected area closest to the current position based on the rasterized storage tank bottom plate drawing is a diffusion method.

3. The path tracking method for the in-oil inspection robot for the storage tank bottom plate in the invisible environment according to claim 1, wherein the controlling the robot to move to the target point using a path tracking algorithm according to the moving path comprises:

determining the current position of the robot in the rasterized storage tank bottom plate drawing according to the ultrasonic positioning signal of the robot;

calculating a deviation angle error according to the current position and the moving path;

when the deviation angle error is greater than a deviation angle error threshold, correcting a moving direction of the robot through a spin turn; and when the deviation angle error is not greater than the deviation angle error threshold, correcting the moving direction of the robot by correcting a deviation while the robot is moving forward.

4. The path tracking method for the in-oil inspection robot for the storage tank bottom plate in the invisible environment according to claim 3, wherein a formula of calculating the deviation angle error is:

$$\cos\theta = \frac{u_1 v_1 + u_2 v_2}{\sqrt{u_1^2 + v_1^2}\sqrt{u_2^2 + v_2^2}};$$

where $\theta$ is the deviation angle error, $u_1$ and $v_1$ are an x-axis distance and a y-axis distance between A and $P_i$, respectively, and $u_2$ and $v_2$ are an x-axis distance and a y-axis distance between $P_{i+1}$ and $P_i$, respectively, $P_i$ is a position of an $i^{th}$ path point, A is the current position, $P_{i+1}$ is a position of an $(i+1)^{th}$ path point, wherein $P_i$ is located before A, $P_{i+1}$ is located after A.

5. The path tracking method for the in-oil inspection robot for the storage tank bottom plate in the invisible environment according to claim 3, wherein the correcting a moving direction of the robot through the spin turn comprises:

calculating an angle to be rotated using a formula as follows:

$$\beta_{final} = \alpha + \theta,$$

where $\beta_{final}$ is the angle to be rotated, $\alpha$ is an included angle between a vector $AP_{i+1}$ and a vector $P_i P_{i+1}$, $\theta$ is the deviation angle error, A is the current position, $P_i$ is a position of an $i^{th}$ path point, and $P_{i+1}$ is a position of an $(i+1)^{th}$ path point, wherein $P_i$ is located before A, and $P_{i+1}$ is located after A;

assuming that a value of k is 1;

acquiring a rotation angle $\beta_p^k$ of the robot when the robot accelerates from a static state to a constant speed state in a $k^{th}$ rotation process using an inertial navigation sensor of the robot, where p denotes a $p^{th}$ data point where the robot is inspected to enter the constant speed state;

in the constant speed state, constantly acquiring the rotation angle of the robot using the inertial navigation sensor of the robot until a formula $$\frac{\omega_s - \omega_{s-1}}{\omega_{s-1}} > K_\beta$$

is satisfied, and then controlling the robot to stop rotating, where $\omega_s$ is a slope between an $s^{th}$ data point and the $p^{th}$ data point, $\omega_{s-1}$ is a slope between an $(s-1)^{th}$ data point and the $p^{th}$ data point, and $K_\beta$ is an anomaly determination threshold;

calculating a $k^{th}$ rotation angle rotation using a formula:

$$\beta_{end}^k = \beta_p^k + (s-p)\omega_p^k \Delta t + \beta_{stop}(\omega_s^k),$$

where $\beta_{end}^k$ is the $k^{th}$ rotation angle, $\beta_p^k$ is the rotation angle of the robot when the robot accelerates from the static state to the constant speed state in the $k^{th}$ rotation process, $\beta_{stop}(\omega_s^k)$ is an inertia rotation function of the robot for calculating a rotation angle of the robot when the robot changes from $\omega_s^k$ to a stopped state, $\omega_p^k$ is the rotation speed of the robot when the robot accelerates from the static state to the constant speed state in the $k^{th}$ rotation process, $\omega_s^k$ is a rotation speed of the robot when the robot enters an abnormal steering stage from the constant speed state in the $k^{th}$ rotation process, and $\Delta t$ is a time interval between two adjacent data points; and increasing the value of k by 1, and returning to the acquiring a rotation angle $\beta_p^k$ of the robot when the robot accelerates from a static state to a constant speed state in a $k^{th}$ rotation process using an inertial navigation sensor of the robot until the robot rotates to the angle to be rotated.

6. The path tracking method for the in-oil inspection robot for the storage tank bottom plate in the invisible environment according to claim 3, wherein the correcting the moving direction of the robot by correcting a deviation while the robot is moving forward comprises:

controlling rotation speeds of a left motor and a right motor of the robot so that a power difference between the left motor and the right motor is less than a power unbalanced threshold; the left motor is configured to provide power to a left driving wheel of the robot, and the right motor is configured to provide power to a right driving wheel of the robot; or controlling the rotation speeds of the left motor and the right motor of the robot using a proportional integral differential (PID) control algorithm, so that a path vertical deviation of the robot is less than a vertical deviation threshold.

7. The path tracking method for the in-oil inspection robot for the storage tank bottom plate in the invisible environment according to claim 6, wherein a formula of calculating the path vertical deviation is:

$$d = \begin{cases} \frac{kx_A - y_A + b}{\sqrt{k^2 + 1}}, & y_i \neq y_{i+1} \\ x_A - x_i, & y_i = y_{i+1} \end{cases};$$

where d is the path vertical deviation, k is a first-order coefficient, $$k = \frac{y_{i+1} - y_i}{x_{i+1} - x_i},$$

b is a constant coefficient, $b = y_i - kx_i$, $x_i$ and $y_i$ are an x-axis coordinate and a y-axis coordinate of an $i^{th}$ path point, $x_{i+1}$ and $y_{i+1}$ are an x-axis coordinate and a y-axis coordinate of an $(i+1)^{th}$ path point, and $x_A$ and $y_A$ are an x-axis coordinate and a y-axis coordinate of the current position.

8. A path tracking device for an in-oil inspection robot for a storage tank bottom plate in an invisible environment, comprising: a positioning module, an inspection sensor, an obstacle avoidance sensor array and a main control module, wherein the positioning module comprises ultrasonic transmitters positioned in a front of the robot and in a rear of the robot;

the obstacle avoidance sensor array comprises three ultrasonic distance sensors installed in different directions in the front of the robot and three ultrasonic distance sensors installed in different directions in the rear of the robot;

the positioning module, the inspection sensor and the obstacle avoidance sensor array are all connected with the main control module, and the main control module is connected with a control terminal of the robot;

the main control module is configured to execute the path tracking method for the in-oil inspection robot for the storage tank bottom plate in the invisible environment according to claim 1 to track a path of the robot.

9. The path tracking device for the in-oil inspection robot for the storage tank bottom plate in the invisible environment according to claim 8, wherein in the path tracking method, a method for searching the cell of the uninspected area closest to the current position based on the rasterized storage tank bottom plate drawing is a diffusion method.

10. The path tracking device for the in-oil inspection robot for the storage tank bottom plate in the invisible environment according to claim 8, wherein in the path tracking method, the controlling the robot to move to the target point using a path tracking algorithm according to the moving path comprises:

determining the current position of the robot in the rasterized storage tank bottom plate drawing according to the ultrasonic positioning signal of the robot;

calculating a deviation angle error according to the current position and the moving path;

when the deviation angle error is greater than a deviation angle error threshold, correcting a moving direction of the robot through a spin turn; and when the deviation angle error is not greater than the deviation angle error threshold, correcting the moving direction of the robot by correcting a deviation while the robot is moving forward.

11. The path tracking device for the in-oil inspection robot for the storage tank bottom plate in the invisible environment according to claim 10, wherein in the path tracking method, a formula of calculating the deviation angle error is:

$$\cos\theta = \frac{u_1 v_1 + u_2 v_2}{\sqrt{u_1^2 + v_1^2}\sqrt{u_2^2 + v_2^2}};$$

where $\theta$ is the deviation angle error, $u_1$ and $v_1$ are an x-axis distance and a y-axis distance between A and $P_i$, respectively, and $u_2$ and $v_2$ are an x-axis distance and a y-axis distance between $P_{i+1}$ and $P_i$, respectively, $P_i$ is a position of an $i^{th}$ path point, A is the current position, $P_{i+1}$ is a position of an $(i+1)^{th}$ path point, wherein $P_i$ is located before A, $P_{i+1}$ is located after A.

12. The path tracking device for the in-oil inspection robot for the storage tank bottom plate in the invisible environment according to claim 10, wherein in the path tracking method, the correcting a moving direction of the robot through the spin turn comprises:

calculating an angle to be rotated using a formula as follows:

$$\beta_{final} = \alpha + \theta,$$

where $\beta_{final}$ is the angle to be rotated, $\alpha$ is an included angle between a vector $AP_{i+1}$ and a vector $P_i P_{i+1}$, $\theta$ is the deviation angle error, A is the current position, $P_i$ is a position of an $i^{th}$ path point, and $P_{i+1}$ is a position of an $(i+1)^{th}$ path point, wherein $P_i$ is located before A, and $P_{i+1}$ is located after A;

assuming that a value of k is 1;

acquiring a rotation angle $\beta_p^k$ of the robot when the robot accelerates from a static state to a constant speed state in a $k^{th}$ rotation process using an inertial navigation sensor of the robot, where p denotes a $p^{th}$ data point where the robot is inspected to enter the constant speed state;

in the constant speed state, constantly acquiring the rotation angle of the robot using the inertial navigation sensor of the robot until a formula $$\frac{\omega_s - \omega_{s-1}}{\omega_{s-1}} > K_\beta$$

is satisfied, and then controlling the robot to stop rotating, where $\omega_s$ is a slope between an $s^{th}$ data point and the $p^{th}$ data point, $\omega_{s-1}$ is a slope between an $(s-1)^{th}$ data point and the $p^{th}$ data point, and $K_\beta$ is an anomaly determination threshold;

calculating a $k^{th}$ rotation angle rotation using a formula:

$$\beta_{end}^k = \beta_p^k + (s-p)\omega_p^k \Delta t + \beta_{stop}(\omega_s^k),$$

where $\beta_{end}^k$ is the $k^{th}$ rotation angle, $\beta_p^k$ is the rotation angle of the robot when the robot accelerates from the static state to the constant speed state in the $k^{th}$ rotation process, $\beta_{stop}(\omega_s^k)$ is an inertia rotation function of the robot for calculating a rotation angle of the robot when the robot changes from $\omega_s^k$ to a stopped state, $\omega_p^k$ is the rotation speed of the robot when the robot accelerates from the static state to the constant speed state in the $k^{th}$ rotation process, $\omega_s^k$ is a rotation speed of the robot when the robot enters an abnormal steering stage from the constant speed state in the $k^{th}$ rotation process, and $\Delta t$ is a time interval between two adjacent data points; and increasing the value of k by 1, and returning to the acquiring a rotation angle $\beta_p^k$ of the robot when the robot accelerates from a static state to a constant speed state in a $k^{th}$ rotation process using an inertial navigation sensor of the robot until the robot rotates to the angle to be rotated.

13. The path tracking device for the in-oil inspection robot for the storage tank bottom plate in the invisible environment according to claim 10, wherein in the path tracking method, the correcting the moving direction of the robot by correcting a deviation while the robot is moving forward comprises:

controlling rotation speeds of a left motor and a right motor of the robot so that a power difference between the left motor and the right motor is less than a power unbalanced threshold; the left motor is configured to provide power to a left driving wheel of the robot, and the right motor is configured to provide power to a right driving wheel of the robot; or controlling the rotation speeds of the left motor and the right motor of the robot using a proportional integral differential (PID) control algorithm, so that a path vertical deviation of the robot is less than a vertical deviation threshold.

14. The path tracking device for the in-oil inspection robot for the storage tank bottom plate in the invisible environment according to claim 13, wherein in the path tracking method, a formula of calculating the path vertical deviation is:

$$d = \begin{cases} \dfrac{kx_A - y_A + b}{\sqrt{k^2 + 1}}, & y_i \neq y_{i+1} \\ x_A - x_i, & y_i = y_{i+1} \end{cases};$$

where d is the path vertical deviation, k is a first-order coefficient, $$k = \frac{y_{i+1} - y_i}{x_{i+1} - x_i}, \qquad 5$$

b is a constant coefficient, $b = y_i - kx_i$, $x_i$ and $y_i$ are an x-axis coordinate and a y-axis coordinate of an $i^{th}$ path point, $x_{i+1}$ and $y_{i+1}$ are an x-axis coordinate and a y-axis coordinate of an $(i+1)^{th}$ path point, and $x_A$ and $y_A$ are an x-axis coordinate and a y-axis coordinate of the current position.

\* \* \* \* \*